United States Patent
Ito et al.

(10) Patent No.: US 7,850,231 B2
(45) Date of Patent: Dec. 14, 2010

(54) SUNROOF APPARATUS FOR VEHICLE

(75) Inventors: Yoshiyasu Ito, Sakura (JP); Hiroyuki Tsukamoto, Sakura (JP); Kouichi Hotta, Sakura (JP); Michio Tamura, Wako (JP)

(73) Assignees: Yachiyo Industry Co., Ltd. (JP); Honda Motor Co., Ltd. (JP)

( * ) Notice: Subject to any disclaimer, the term of this patent is extended or adjusted under 35 U.S.C. 154(b) by 65 days.

(21) Appl. No.: 12/221,840

(22) Filed: Aug. 7, 2008

(65) Prior Publication Data

US 2009/0039682 A1 Feb. 12, 2009

(30) Foreign Application Priority Data

Aug. 10, 2007 (JP) ............................. 2007-209873
Aug. 10, 2007 (JP) ............................. 2007-209928

(51) Int. Cl.
*B60J 7/047* (2006.01)
(52) U.S. Cl. .................. 296/220.01; 296/222; 296/224; 296/216.03
(58) Field of Classification Search ............ 296/216.03, 296/221–222, 224, 220.01
See application file for complete search history.

(56) References Cited

U.S. PATENT DOCUMENTS 5,795,016 A * 8/1998 Otake ......................... 296/223
5,941,598 A 8/1999 Cave et al. ................... 296/213

FOREIGN PATENT DOCUMENTS

| JP | 07290965 | 11/1995 |
| JP | 11348571 | 12/1999 |
| JP | H04026254 | 6/2008 |
| WO | 03086798 | 10/2003 |

* cited by examiner

*Primary Examiner*—Dennis H Pedder
(74) *Attorney, Agent, or Firm*—Adams & Wilks

(57) ABSTRACT

A vehicular sunroof apparatus includes a sunroof panel having a front panel and a rear panel configured to open and close an opening formed in a vehicle roof. A first drive mechanism effects rising/lowering and opening/closing movements of the front panel relative to the opening of the vehicle roof. A second drive mechanism effects rising/lowering and opening/closing movements of the rear panel relative to the opening of the vehicle roof. The second drive mechanism comprises a rear panel support stay that supports the rear panel, a stay extension connected to the rear panel support stay and mounted to undergo sliding and vertical swinging movement relative to the vehicle roof, and a stopper member that is mounted on the vehicle roof and that provides an upper limit of vertical swing of the stay extension.

15 Claims, 15 Drawing Sheets

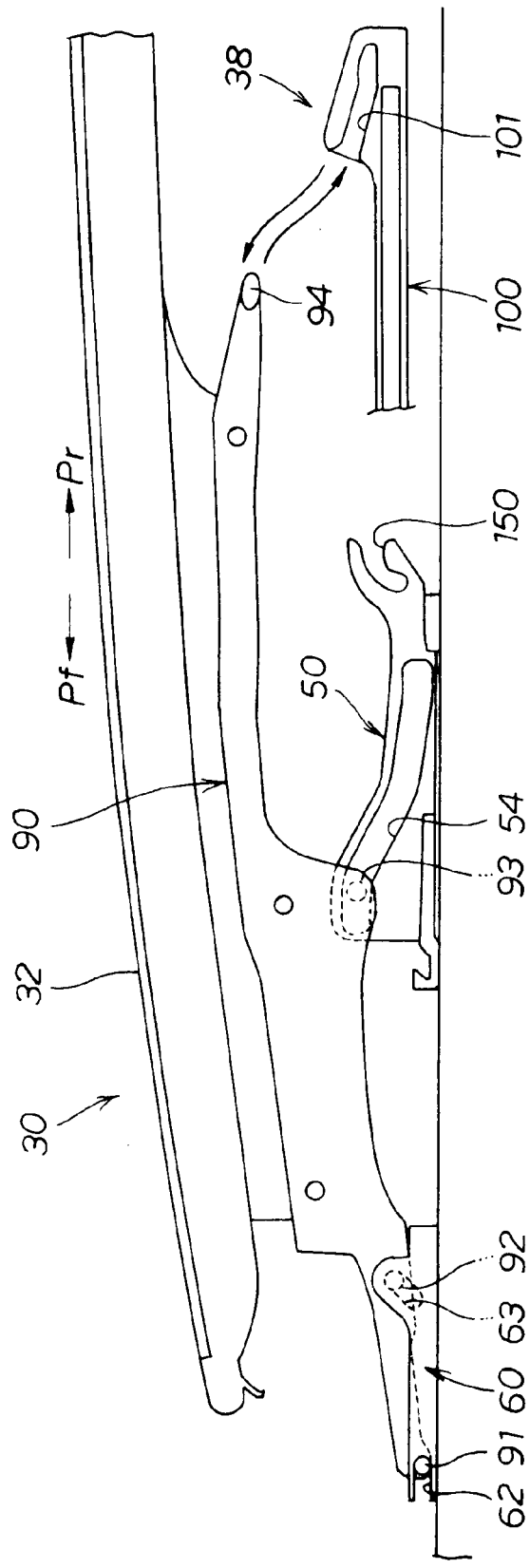
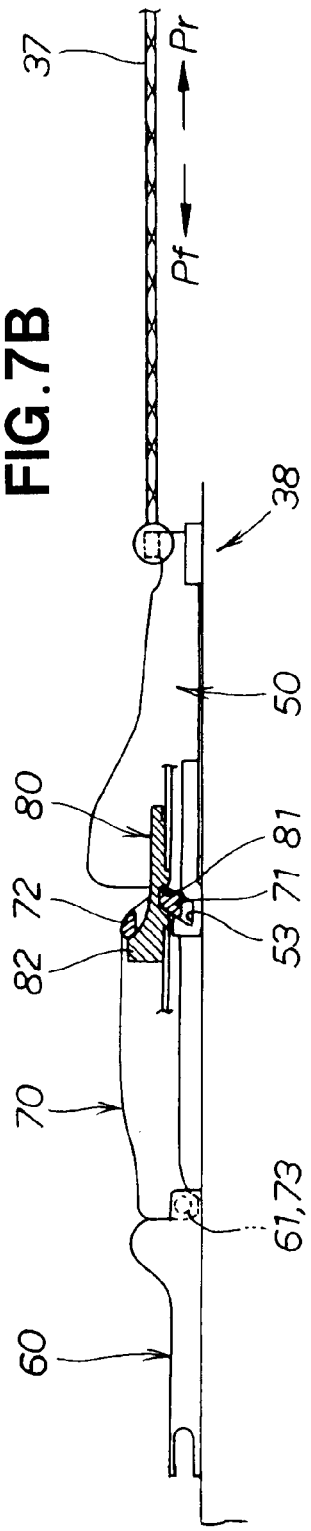

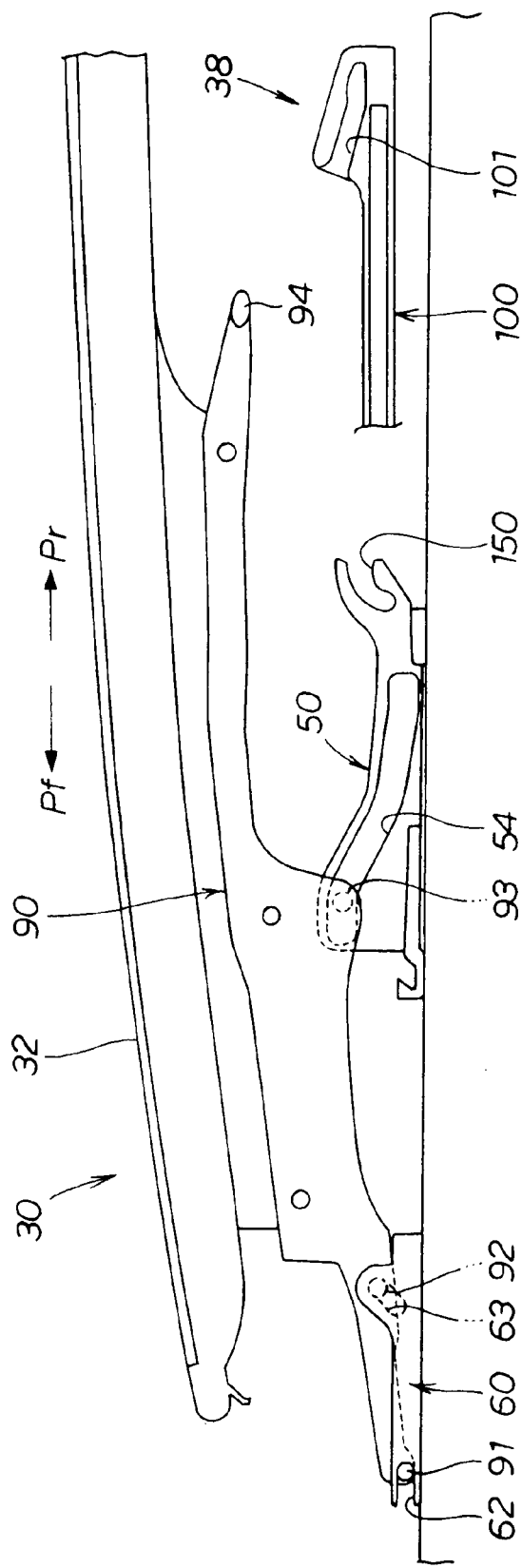
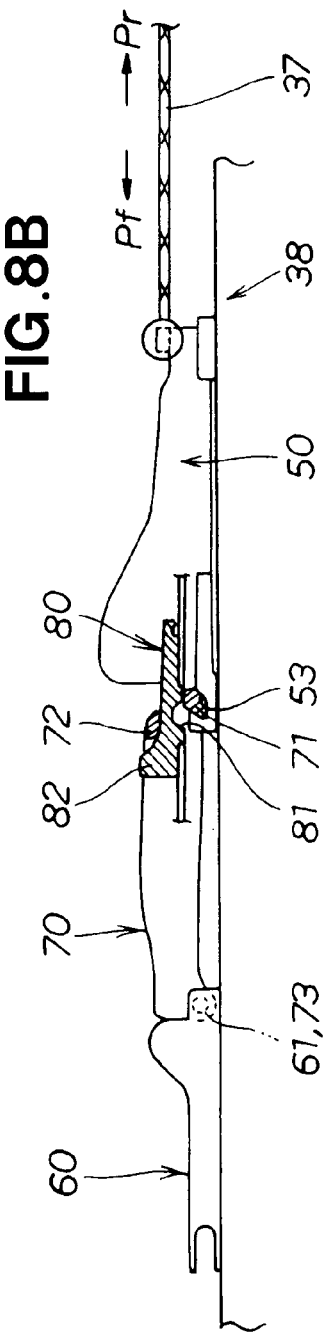

FIG.10
(a)
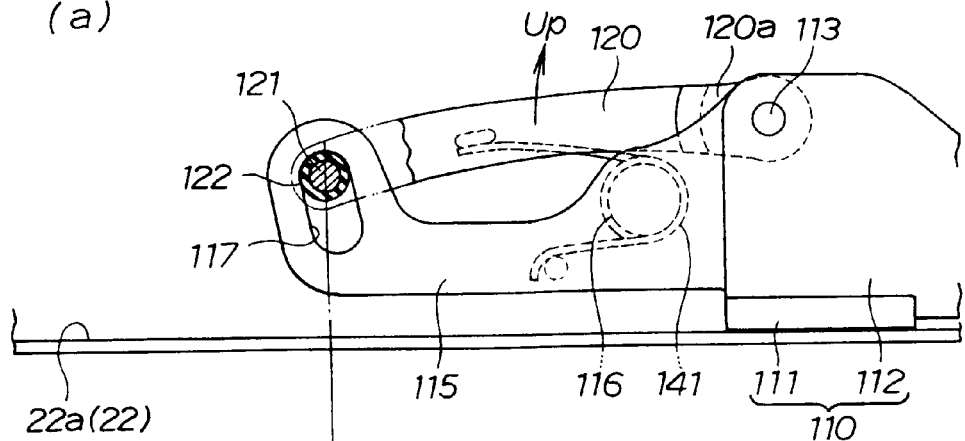
(b)
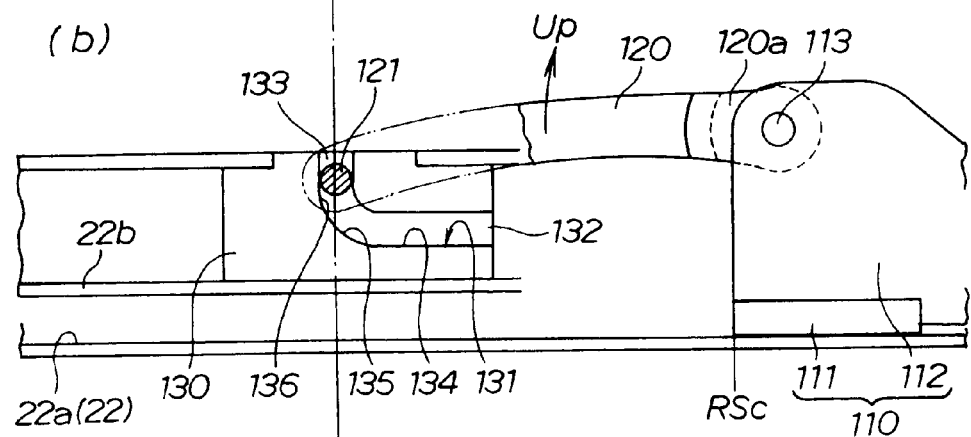
(c)
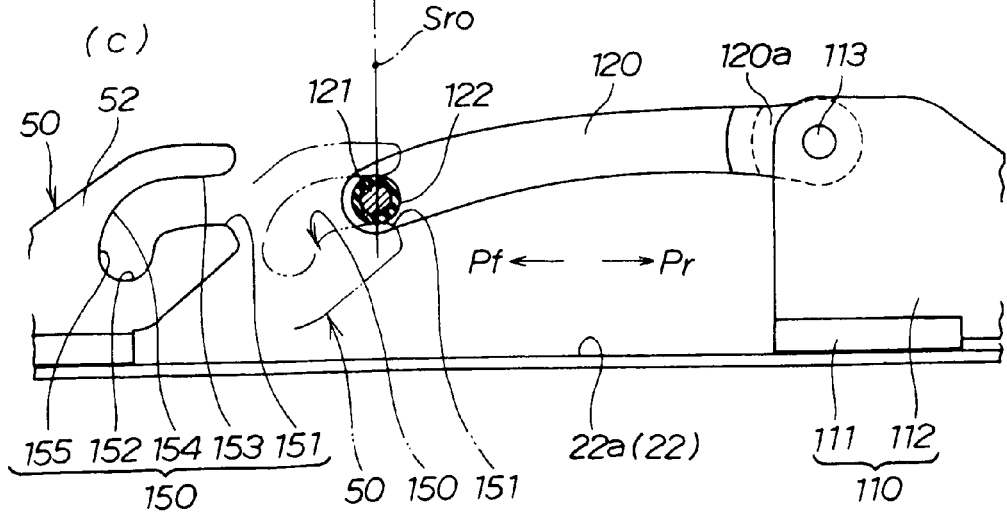

FIG.11
(a)
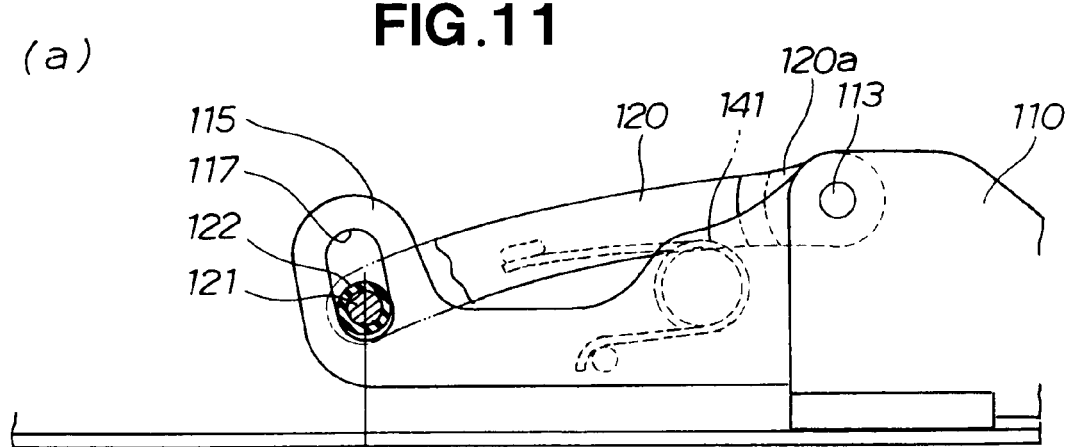
(b)
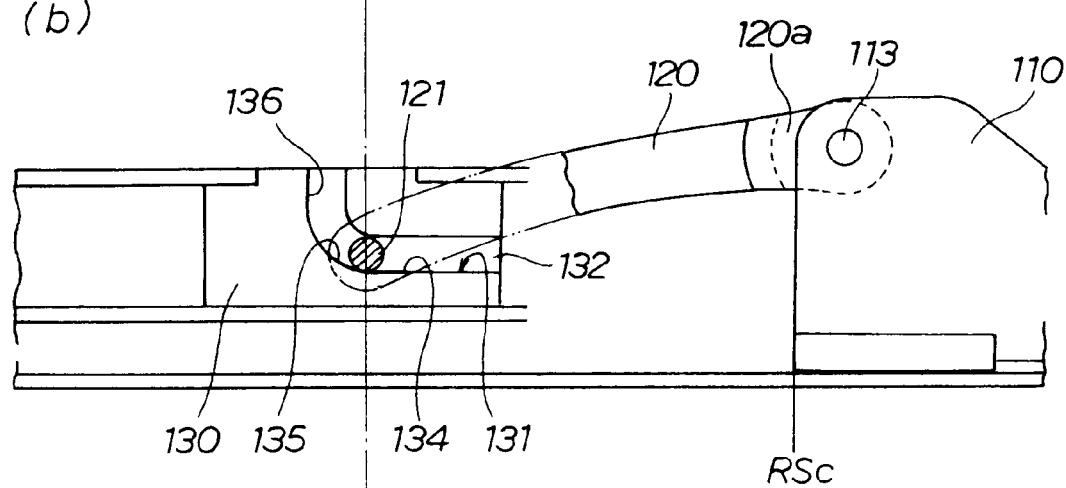
(c)
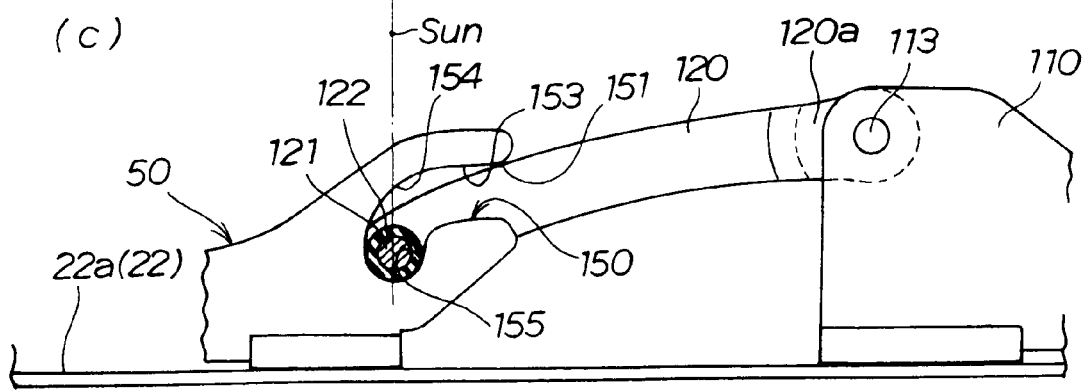
Pf ← → Pr

FIG.12
(a)
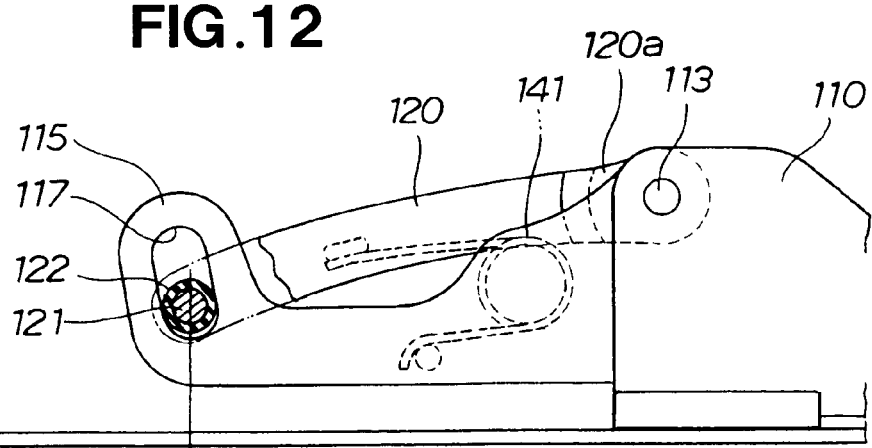
(b)
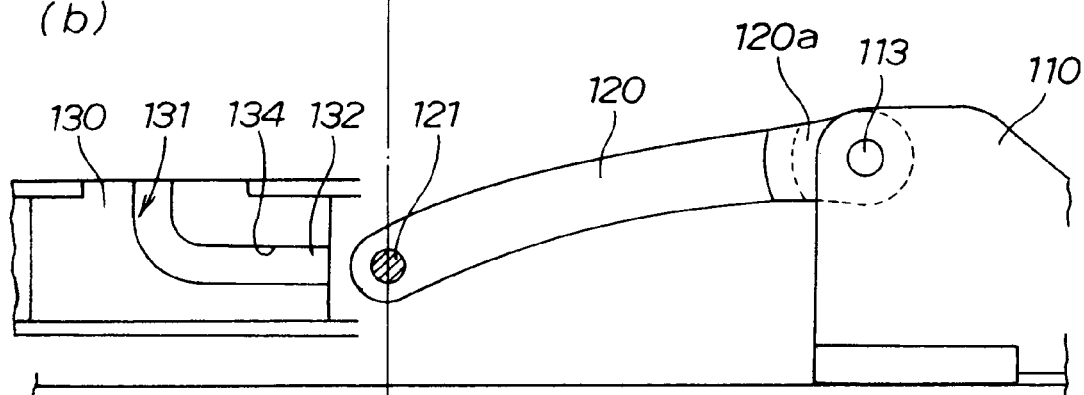
(c)
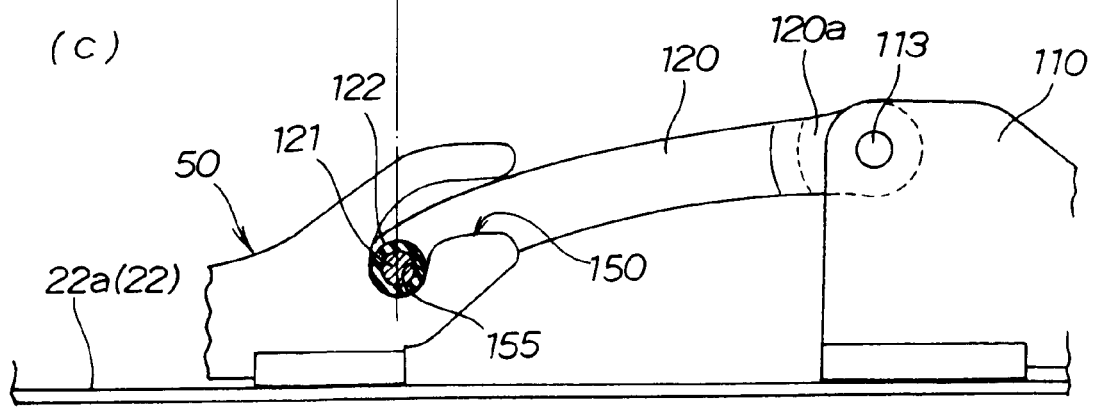
Pf ← → Pr

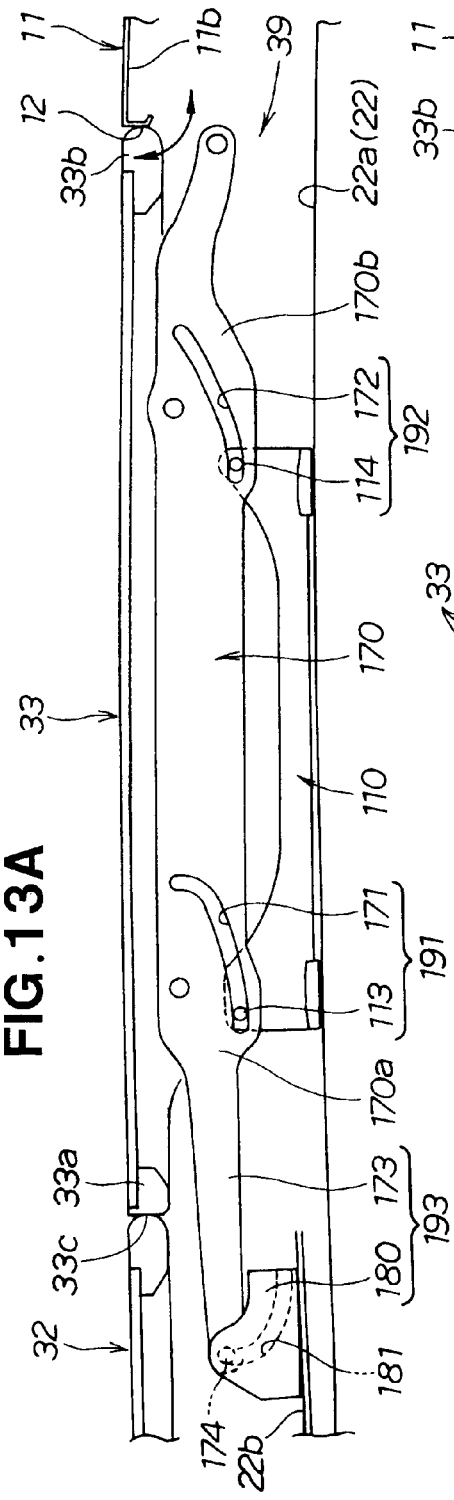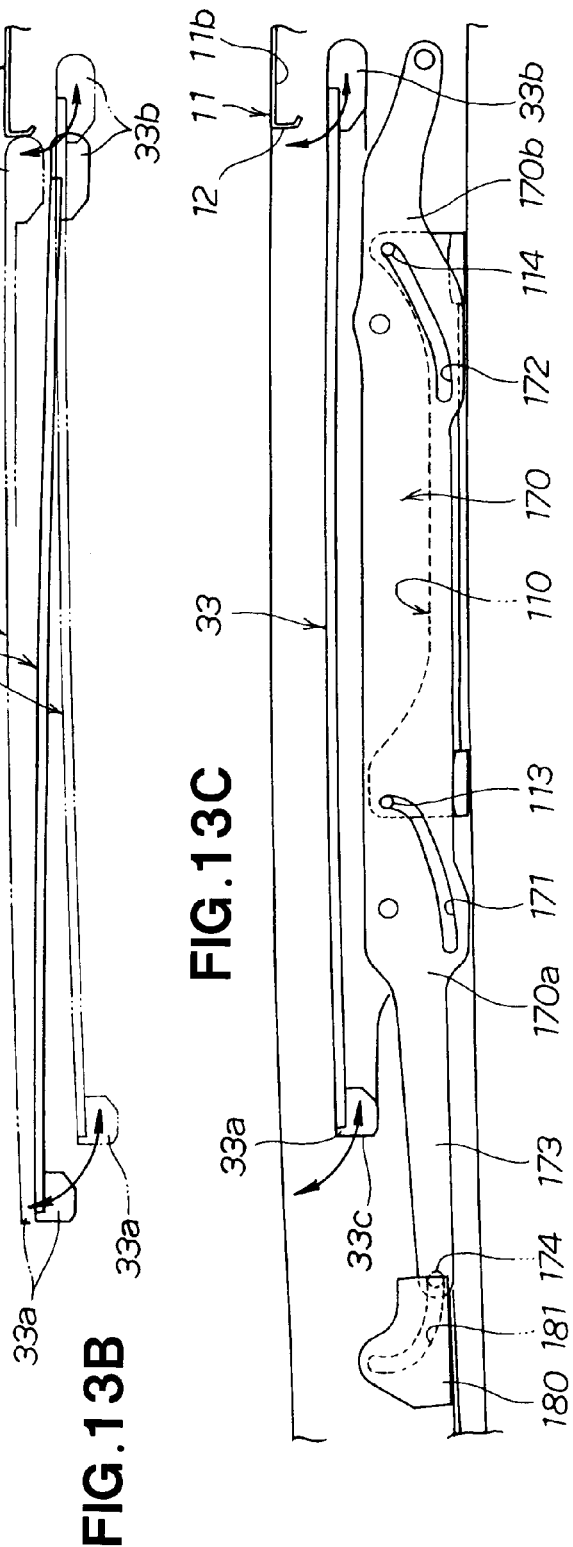

SUNROOF APPARATUS FOR VEHICLE

FIELD OF THE INVENTION

The present invention relates to a vehicular sunroof apparatus in which a sunroof panel for opening and closing an opening formed in a vehicle roof is comprised of two panels, namely, a front panel and a rear panel.

BACKGROUND OF THE INVENTION

Recently, there have been advances in the development of techniques for increasing as much as possible the amount by which the opening in a roof opens in sunroof apparatuses for vehicles. In systems for opening and closing the opening by means of one sunroof panel, there are limits to increasing the size of the opening. Systems for segmenting the sunroof panel have been considered to overcome these limits. However, this is not the best recourse because the configuration becomes complicated if the panel is segmented excessively. With this in view, a technique of a system for longitudinally halving the sunroof panel into a front panel and a rear panel is disclosed in Japanese Utility Model Publication No. 04-26254 (JP-U 04-26254 B).

In the sunroof apparatus disclosed in JP-U 04-26254, a front panel and a rear panel are opened and closed separately by a motor via a wire cable. The operation of the rear panel is in indirect engagement with the operation of the front panel via the wire cable. The motor opens the front and rear panels by pulling the wire cable, and closes the front and rear panels by pushing the wire cable.

More specifically, when in a fully closed state, the front and rear panels are opened in the following procedure. First, the rear end of the front panel is inclined upward (i.e., tilted up). Next, the front panel retracts along the outside surface of the roof, and opens to a half-open position. Next, the rear panel is lowered below the inside surface of the roof. Lastly, while the rear panel retracts along the inside surface of the roof and opens to a fully open position, the front panel retracts along the outside surface of the roof and opens to a fully open position.

As described above, the fully closed rear panel begins to lower at the point when the front panel retracts and comes near the rear panel. Therefore, the timing by which the rear panel retracts is delayed proportionate to the lowering of the rear panel. Since the front panel and rear panel are engaged with each other via the wire cable, the front panel comes into proximity of the rear panel while the rear panel is lowering. Caution must therefore be taken so that the retracted front panel does not come into contact with the rear panel.

One possibility is to accelerate the timing by which the rear panel begins to open. However, if the timing by which the rear panel begins to open is accelerated, the front panel will have not yet reached the fully open position at the point when the rear panel has reached the fully open position. The front panel and rear panel then cannot both be fully opened, and the size of the opening therefore cannot be increased.

In view of this, there is a demand for a technique whereby a roof opening can be opened and closed in a larger amount without the front panel and rear panel interfering with each other.

SUMMARY OF THE INVENTION

According to the present invention, there is provided a sunroof apparatus comprising a sunroof panel which is comprised of a front panel and a rear panel for opening and closing an opening formed in a vehicle roof, the front panel and the rear panel being designed to be opened by causing the front panel to retract from a fully closed state, with a rear end thereof inclined upwardly, along an outside surface of the roof and by causing the rear panel to retract, during retracting movement of the front panel, from a fully closed state along an inside surface of the roof, wherein the sunroof apparatus further comprises a rear panel drive mechanism for effecting rising/lowering and opening/closing movements of the rear panel relative to the opening, the rear panel drive mechanism having a restricting part for restricting a front end part of the rear panel from rising when a rear end part of the rear panel in the fully closed state is lowered.

Thus, the rear panel can be raised and lowered, and also opened and closed by the rear panel drive mechanism in relation to the opening in the roof. While the front panel in a fully closed state is inclined upward at the rear end and retracting along the outside surface of the roof, the rear panel in a fully closed state is retracted along the inside surface of the roof. At this time, the front end part of the rear panel is restricted by the restricting part so as to not rise. In other words, when the rear end part of the rear panel is lowered, the front end part of the rear panel does not rise. Commensurate with the lack of rising, there is no concern over the front panel coming into contact with the front end part of the rear panel even if the front panel is retracted excessively. Therefore, the rear panel can begin to open at the point when the retracting front panel comes into proximity of the front end part of the rear panel. In other words, the timing by which the rear panel begins to open can be delayed to a degree commensurate with the lack of rising in the front end part of the rear panel. By delaying the timing of the start of opening, the front panel and the rear panel can be made to simultaneously reach their specific fully open positions. Since both the front panel and the rear panel can be fully opened, a large opening can be opened widely. As a result, when the sunroof panel is fully open, the amount by which it is open is enlarged.

Preferably, the rear panel drive mechanism includes a rear panel support stay for supporting the rear panel, the rear panel support stay being slidable back and forth and vertically swingingable relative to the roof, the restricting part being comprised of a stay extension extending forward from the rear panel support stay and a stopper member for providing an upper limit of upward swing of the stay extension, the stopper member being provided on the roof at a position farther forward than the rear panel in the fully closed state.

Desirably, the stopper member is designed to restrict the stay extension from swinging upward and the stay extension from sliding forward and backward when the rear panel is in the fully closed state, and to allow the stay extension to slide forward and backward when the front end part of the rear panel is placed in a lowered position.

In a preferred form, the stopper member has a substantially arcuate guide groove for guiding a distal end part of the stay extension, one end of the guide groove being opened so as to allow the distal end part of the stay extension to enter and exit when the front end part of the rear panel is lowered, an opposite end of the guide groove being positioned higher than the one end of the guide groove and closed so as to restrict the distal end part of the stay extension from rising and from sliding forward and backward when the rear panel is in the fully closed state.

It is preferred that the rear panel drive mechanism be arranged such that when the fully closed rear panel is opened, the rear end part of the rear panel is capable of retracting movement along the inside surface of the roof while being lowered ahead of the front end part of the rear panel.

Preferably, the rear panel drive mechanism comprises: a rear slider capable of sliding movement forward and backward relative to the roof, a rear panel support stay for supporting the rear panel; rear stay engagement parts for engaging the rear panel support stay to cause the support stay to retract while lowering in response to retracting movement of the rear slider; and a restricting part for restricting the front end part of the rear panel support stay so that the front end part retracts while lowering after the rear end part of the rear panel support stay when the rear end part of the rear panel support stay retracts while lowering.

In a preferred form, the rear stay engagement parts comprise guide pins disposed on the rear slider and cam grooves formed in the rear panel support stay for guided engagement with the guide pin.

It is desirable that the restricting part comprise a stay extension extending forwardly from the front end of the rear panel support stay and a stopper member provided on the roof at a position farther forward than the rear panel in the fully closed state, and the stopper member comprise a guide groove for guiding the distal end part of the stay extension.

BRIEF DESCRIPTION OF THE DRAWINGS

Certain preferred embodiments of the present invention will be described in detail below, by way of example only, with reference to the accompanying drawings, in which:

FIGS. 7A and 7B are schematic views illustrating an operation of the front panel drive mechanism of FIGS. 6A and 6B with the rear end of the front panel upwardly inclined;

FIGS. 8A and 8B are schematic views illustrating an operation of the front panel drive mechanism of FIGS. 6A and 6B, with the rear end of the front panel being inclined upward and beginning to move backward;

FIG. 10 is a schematic view illustrating assemblage of the area surrounding the front part of the rear slider shown in FIG. 9;

FIG. 11 is a view illustrating an operation wherein the slider linking part shown in FIG. 10 is linked with the distal end part of the linking rod;

FIG. 12 is a view illustrating an operation wherein the slider linking part shown in FIG. 10 causes the distal end part of the linking rod to retract;

FIGS. 13A through 13C are schematic views illustrating assemblage of the left rear panel drive mechanism shown in FIG. 9;

DETAILED DESCRIPTION OF THE PREFERRED EMBODIMENTS

Figure 1:
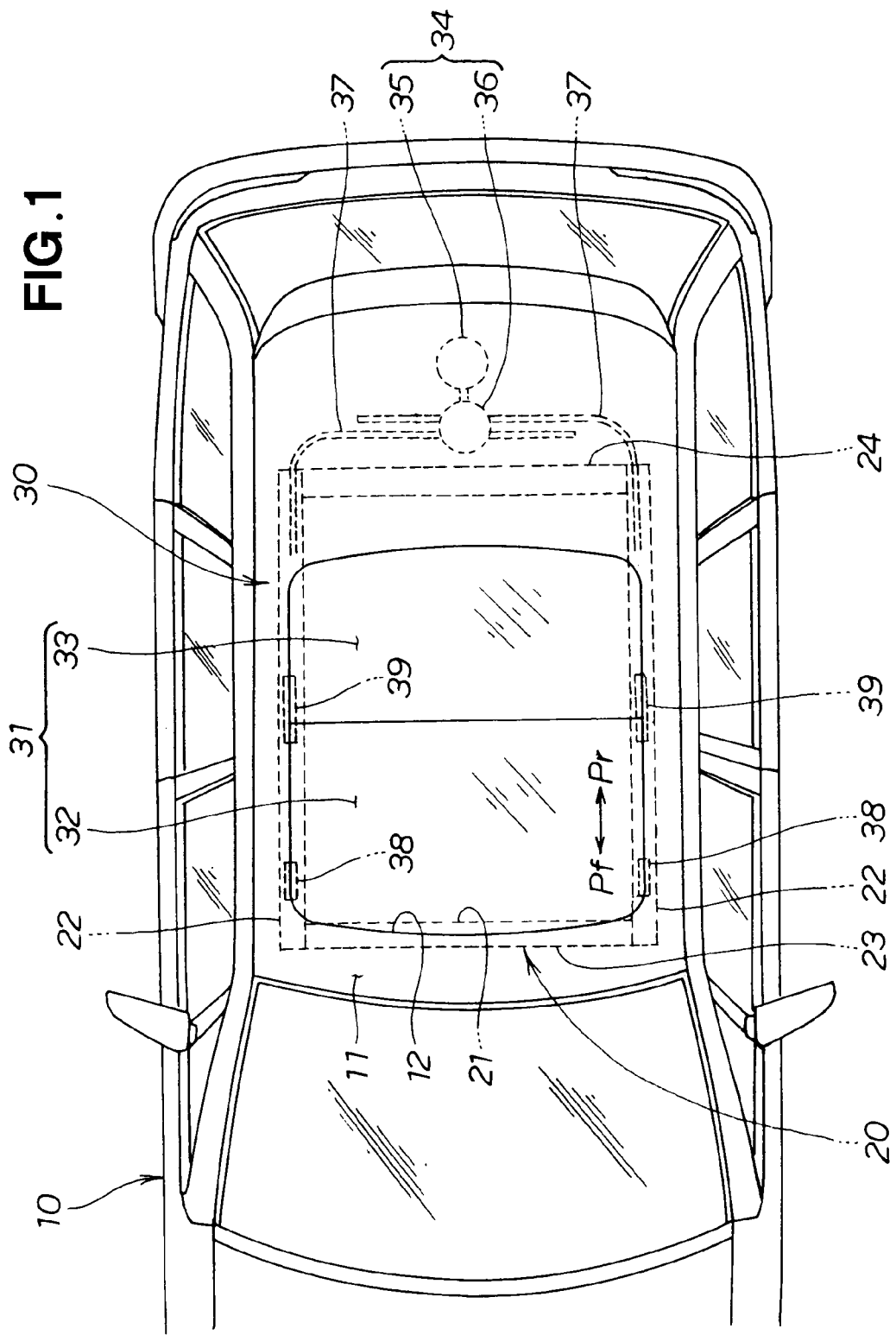
FIG. 1 is a top plan view showing a vehicle employing a sunroof apparatus according to the present invention.
Figure 2:
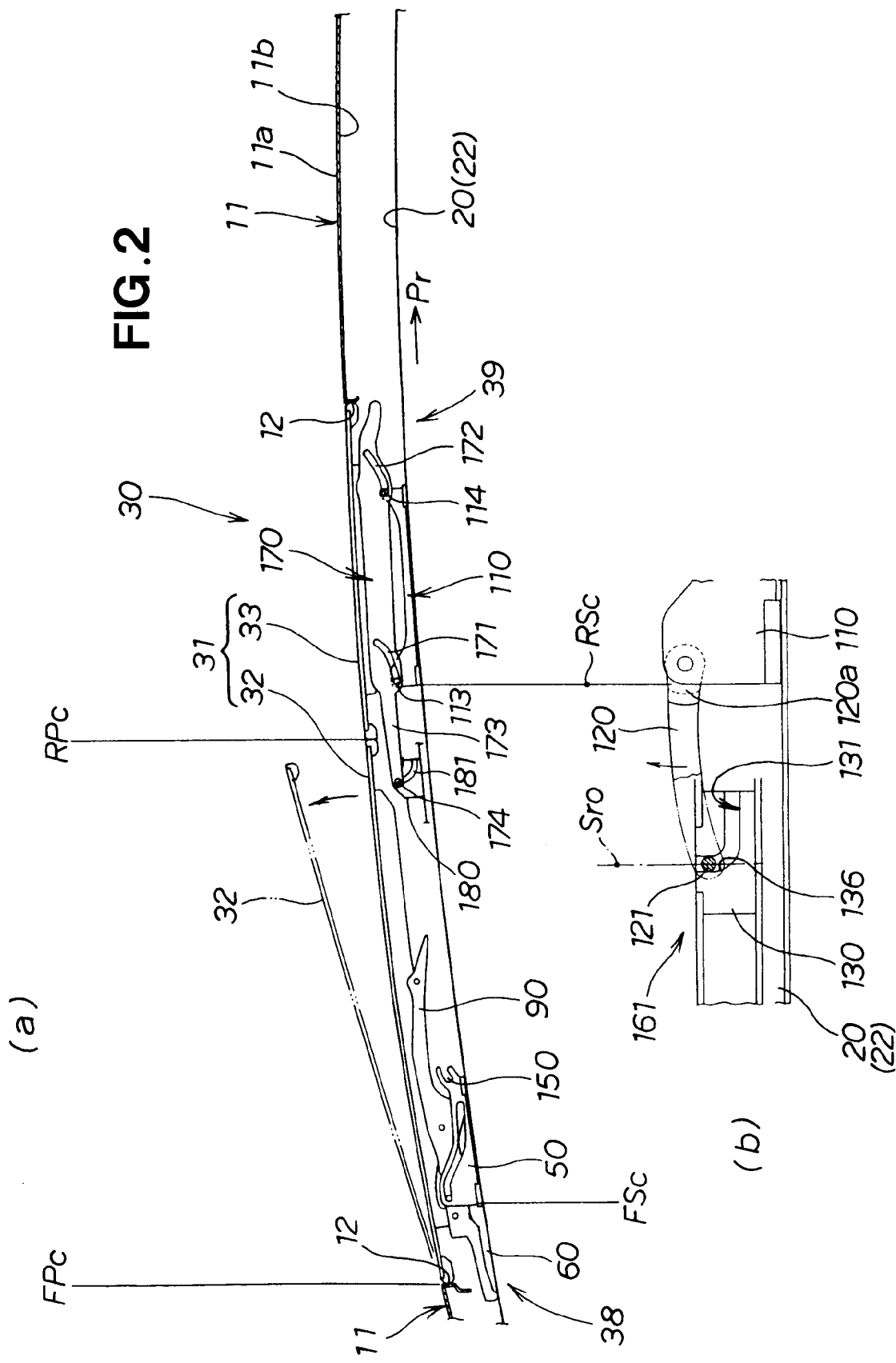
FIG. 2 is a cross-sectional view showing the sunroof apparatus with the front panel and rear panel of FIG. 1 placed in a fully closed state.

Reference is now made to FIG. 1 showing the area surrounding a roof 11 of a vehicle 10 employing a sunroof apparatus 30 and to FIG. 2 showing the roof 11 and the sunroof apparatus 30 with a front panel 32 and a rear panel 33 both placed in a fully closed state.

The roof 11 has an opening 12 that exposes the interior to the exterior, and a roof frame 20 disposed so as to enclose the opening 12, as shown in FIG. 1.

The roof frame 20 has a frame that is substantially rectangular in a plan view, the frame being provided to the roof 11. The roof frame 20 has a pair of left and right side frame members 22, 22, a front frame member 23, and a rear frame member 24. These members 22, 22, 23, 24 are configured from extrudates made of, e.g., an aluminum alloy or another such metal material. The left and right side frame members 22, 22 extend longitudinally along the vehicle body. The front frame member 23 is a member for joining the front ends of the left and right side frame members 22, 22 together. The rear frame member 24 is a member for joining the rear ends of the left and right side frame members 22, 22 together. A space 21 (opening 21) enclosed by the frame members 22, 22, 23, 24 coincides with the position of the opening 12 of the roof 11.

The sunroof apparatus 30 opens and closes the openings 12, 21 by means of a sunroof panel 31. The sunroof apparatus 30 has the sunroof panel 31, a motor drive unit 34, left and right wire cables 37, 37, left and right front-panel drive mechanisms 38, 38, and left and right rear panel drive mechanisms 39, 39.

The sunroof panel 31 has two panels, i.e., a front panel 32 for opening and closing the front half in the opening 12 of the roof 11, and a rear panel 33 for opening and closing the rear half in the opening 12 of the roof 11, in the front and back. The front panel 32 and the rear panel 33 have, e.g., sheet glass, and weather strips are attached to the peripheral edges thereof.

The motor drive unit 34 is attached to the rear part of the roof frame 20, and the motor drive unit 34 drives the left and right wire cables 37, 37. The motor drive unit 34 has an electric motor 35, and a reducer 36 driven by the electric motor 35.

The reducer 36 drives the left and right wire cables 37, 37 out toward the front-panel drive mechanisms 38, 38, and conversely drives the left and right wire cables 37, 37 back in.

The left and right wire cables 37, 37 are also referred to as push-pull cables. The left and right wire cables 37, 37 are pulled back by the reducer 36, and left and right front sliders 50 (see (a) of FIG. 2) in the left and right front-panel drive mechanisms 38, 38 are thereby pulled backward in the direction of the arrow Pr. The wire cables 37, 37 are pushed out from the reducer 36, whereby the left and right front sliders 50 are pushed forward (in the direction of the arrow Pf).

The left and right front-panel drive mechanisms 38, 38 are mechanisms for opening and closing the front panel 32. The left and right rear panel drive mechanisms 39, 39 are mechanisms for opening and closing the rear panel 33 in conjunction with the left and right front-panel drive mechanisms 38, 38, and are disposed to the rear of the left and right front-panel drive mechanisms 38, 38.

According to this type of sunroof apparatus 30, either a manual operation mode or an automatic operation mode for automatically operating the electric motor 35 can be selected to open and close the front panel 32 and the rear panel 33.

Figure 3:
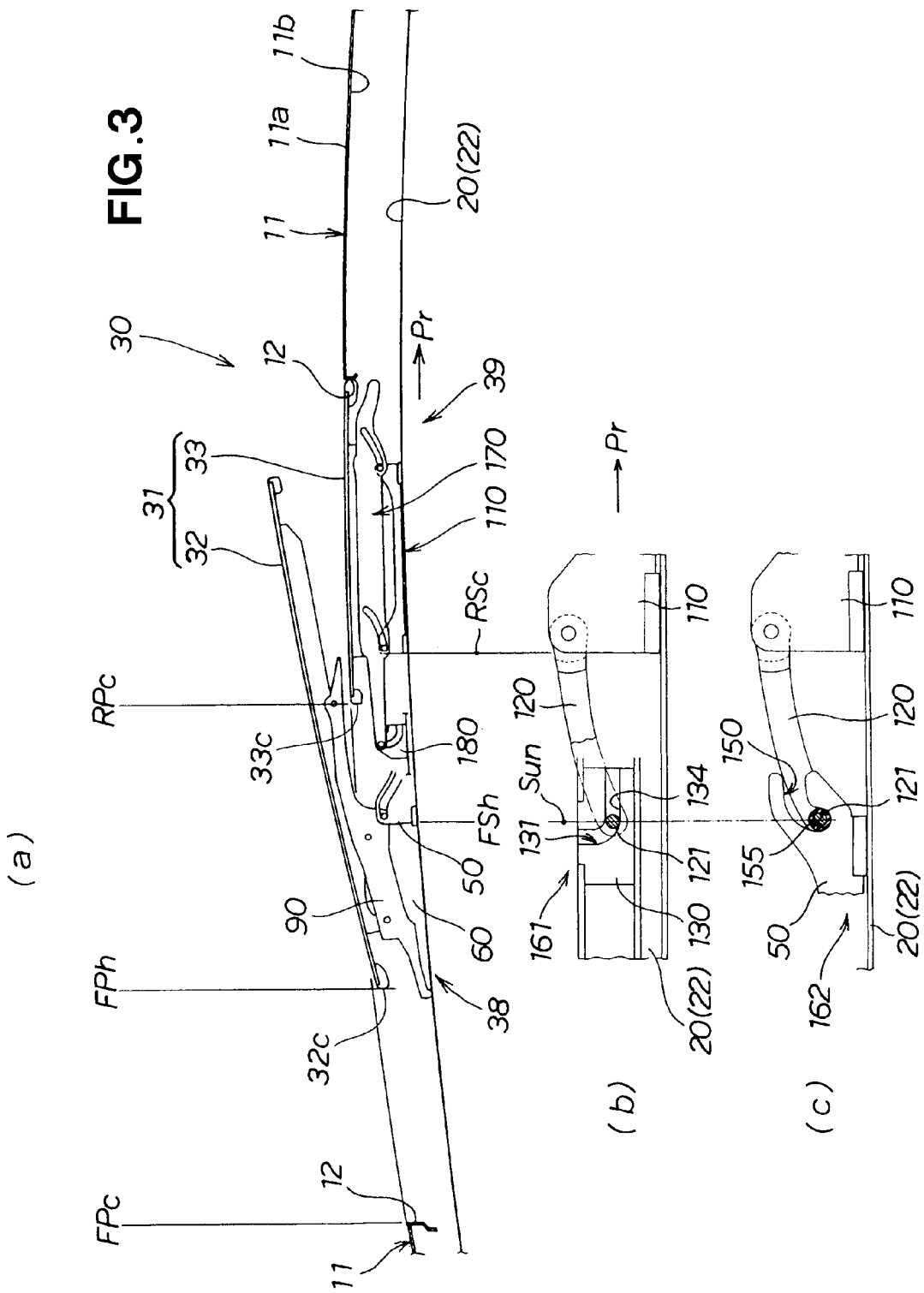
FIG. 3 is a cross-sectional view showing the sunroof apparatus with the front panel of FIG. 2 placed in a half-open state.
Figure 4:
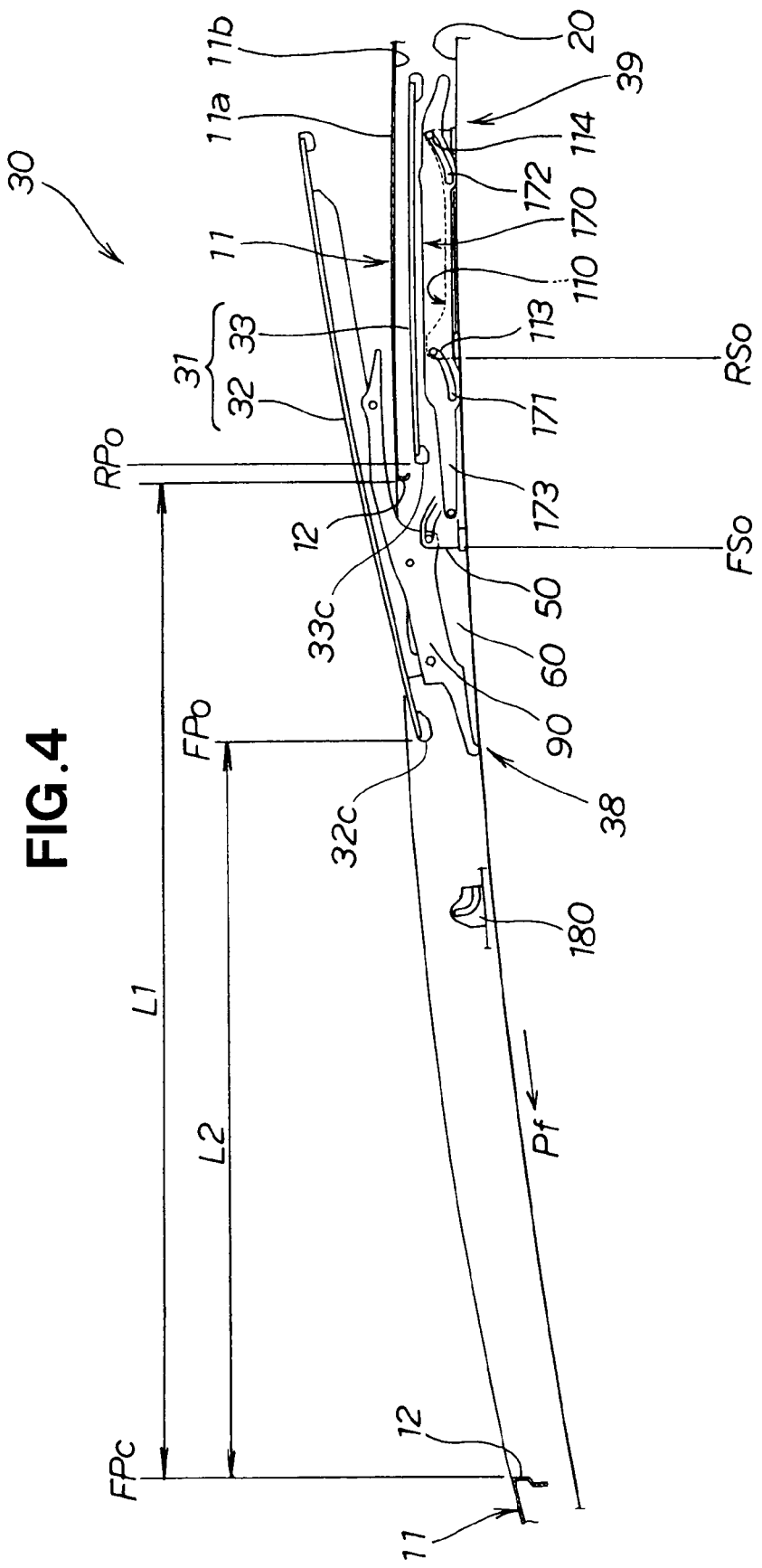
FIG. 4 is a cross-sectional view showing the sunroof apparatus with the front panel and rear panel of FIG. 2 placed in a fully open state.

In the sunroof apparatus 30, the opening and closing operations shown in FIGS. 2 through 4 are performed in accordance with the drive force of the electric motor 35. The panels 32, 33 have the following relationship with the opening 12 when the front panel 32 and the rear panel 33 are both in the fully closed state, as shown in (a) of FIG. 2. Specifically, the front end surface of the front panel 32 is in sealed contact with the front end edge of the opening 12. The rear end surface of the front panel 32 is in sealed contact with the front end edge of the rear panel 33. The rear end surface of the rear panel 33 is in sealed contact with the rear end edge of the opening 12. The position FPc of the front end surface of the front panel 32 in the fully closed state is referred to as the "fully closed position FPc" of the front panel 32. The position RPc of the front end surface of the rear panel 33 in the fully closed state is referred to as the "fully closed position RPc" of the rear panel 33.

In FIG. 3, (a) through (c) show the sunroof apparatus 30 when only the front panel 32 is in a half-open state. When the front panel 32 is in a half-open state, a front end surface 32c of the front panel 32 is in a position FPh, as shown in (a) of FIG. 3. The position FPh of the front end surface 32c of the front panel 32 in the half-open state is hereinbelow referred to as the "half-open position FPh" of the front panel 32.

FIG. 4 shows the sunroof apparatus 30 when the front panel 32 and the rear panel 33 are both in the fully open state. When the front panel 32 and the rear panel 33 are both in the fully open state, the front end surface 32c of the front panel 32 is in a position FPo. At this time, a front end surface 33c of the rear panel 33 is in a position RPo. The position FPo of the front end surface 32c of the front panel 32 in the fully open state is hereinbelow referred to as the "fully open position FPo" of the front panel 32. The position RPo of the front end surface 33c of the rear panel 33 in the fully open state is referred to as the "fully open position RPo" of the rear panel 33.

The front panel 32 and rear panel 33 in the fully closed state are opened by the next step, as shown in (a) of FIG. 2. Pressing an operating switch (not shown), for example, for a fully opening operation causes the electric motor 35 (see FIG. 1) to rotate forward. As a result, the rear end of the front panel 32 is inclined upward (into the state depicted by the imaginary lines). Next, the front panel 32 retracts along an outside surface 11a of the roof 11, and reaches the half-open state as shown in (a) of FIG. 3. Next, the rear panel 33 retracts along an inside surface 11b of the roof 11, and the front panel 32 retracts along the outside surface 11a of the roof 11. As a result, the front panel 32 and the rear panel 33 reach the fully open state as shown in FIG. 4.

In the opening 12, the opening length from the front end edge (position FPc) to the rear end edge is L1. When the sunroof panel 31 is in the fully open state, the distance from the front end edge (position FPc) of the opening 12 to the front end surface 32c (position FPo) of the front panel 32 is L2. The open percentage Ro (%) of the opening 12 is determined by the following formula.

$$Ro=(L2/L1)\times100$$

The front panel 32 and the rear panel 33 in the fully open state as shown in FIG. 4 are closed by the next step. Pressing an operating switch (not shown), for example, for the fully closing operation causes the electric motor 35 (see FIG. 1) to rotate in reverse. As a result, first, the rear panel 33 advances along the inside surface 11b of the roof 11, and the front panel 32 advances along the outside surface 11a of the roof 11. As a result, the rear panel 33 goes back to the original fully closed state, and the front panel 32 reaches the half-open state, as shown in (a) of FIG. 3. Next, the front panel 32 further advances along the outside surface 11a of the roof 11 and returns to the original fully closed position shown in (a) of FIG. 2. The inclined rear end of the front panel 32 subsequently returns to its original height, thereby closing the front panel.

The following definitions are used. The upward inclining of the rear end of the front panel 32 in a substantially horizontal state is referred to as "tilting up." The inclining of the rear end of the front panel 32 to its upper limit is referred to as "tilting up complete." The lowering and returning to the original height of the rear end of the upward-inclined front panel 32 is referred to as "tilting down." The returning of the rear end of the front panel 32 to its original height is referred to as "tilting down complete."

The sliding backward (in the direction of the arrow Pr) and opening of the front panel 32 and rear panel 33 is referred to as "sliding open." The completion of this backward sliding is referred to as "fully slid open." The sliding forward (in the direction of the arrow Pf) and closing of the front panel 32 and rear panel 33 is referred to as "sliding closed." The completion of this forward sliding is referred to as "fully slid closed."

Figure 5:
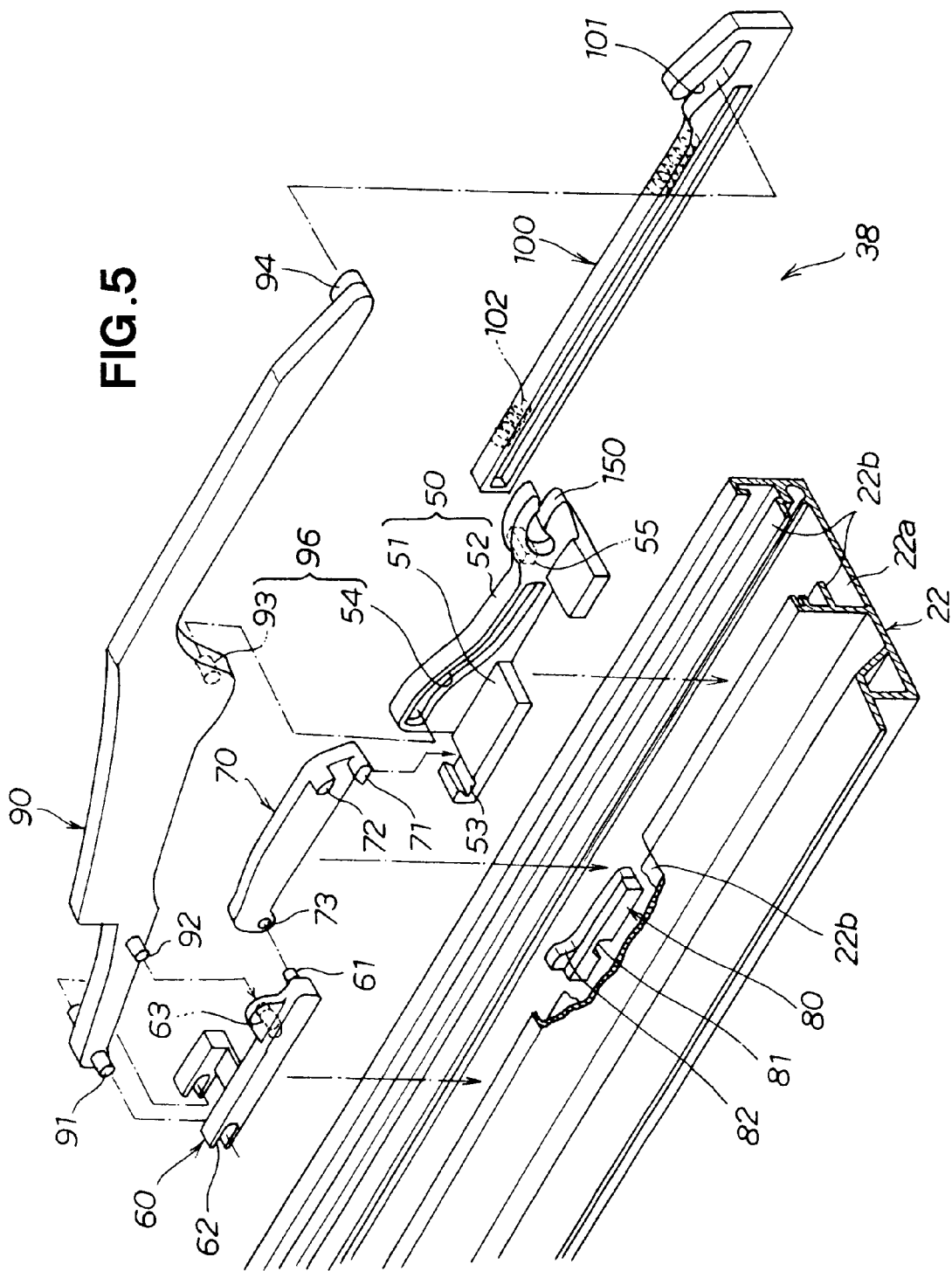
FIG. 5 is an exploded view showing the left front-panel drive mechanism of FIG. 2.
Figure 6A:
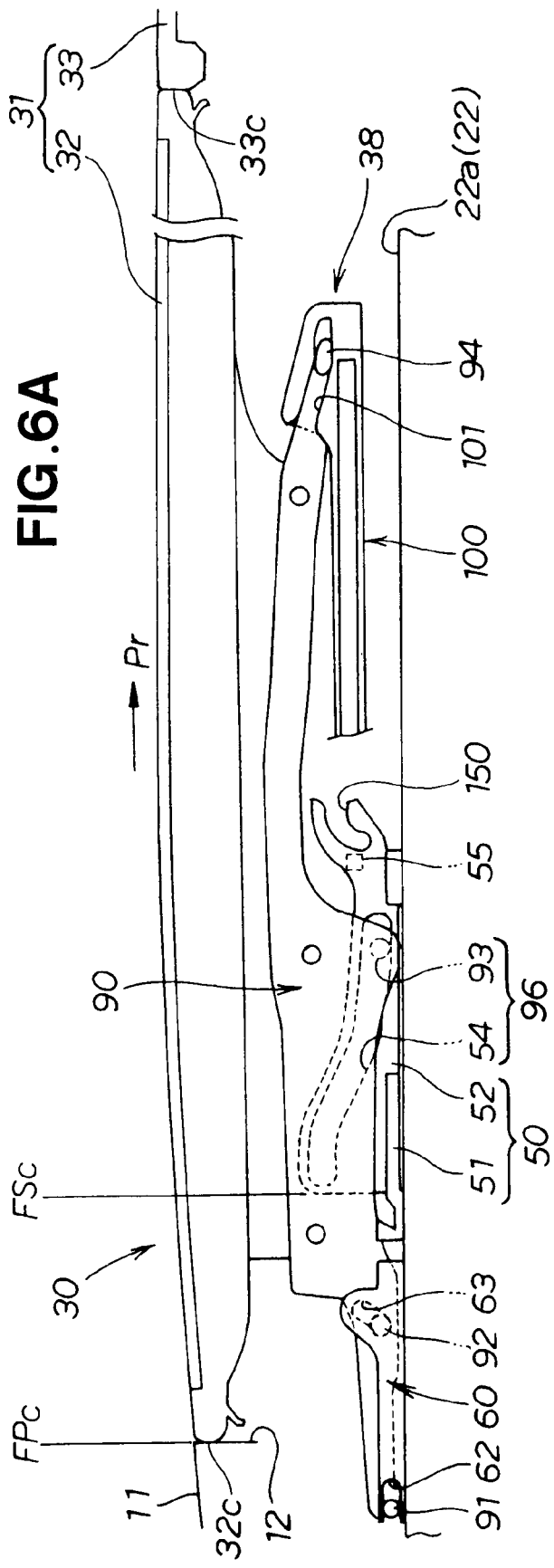
FIGS. 6A and 6B are side elevational views showing the front-panel drive mechanism of FIG. 5.
Figure 6B:
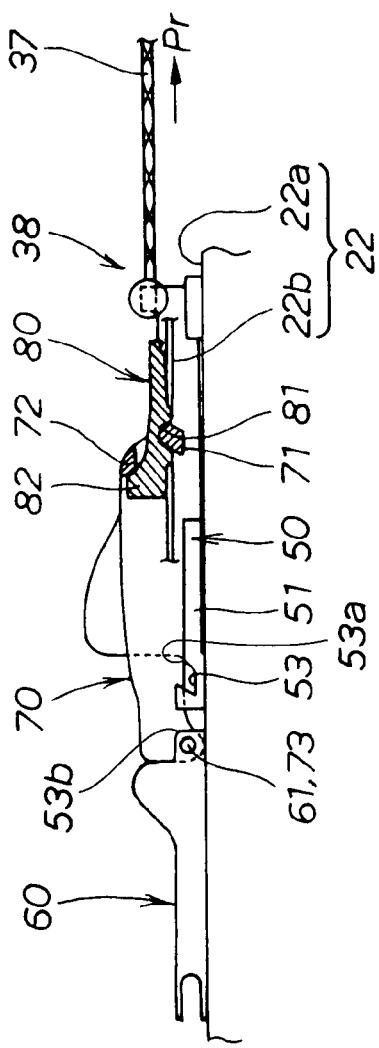

Next, the left side frame member 22 and the left front-panel drive mechanism 38 will be described. The right side frame member 22 and the right front-panel drive mechanism 38 have the same configuration (bilaterally symmetric configuration) as their left counterparts, and are therefore not described. FIG. 5 shows an exploded view of the left front-panel drive mechanism 38 shown in FIG. 2. FIGS. 6A and 6B show the assembled structure of the left front-panel drive mechanism 38 shown in FIG. 5.

The left side frame member 22 has a guide groove 22a extending longitudinally, as shown in FIG. 5. The guide groove 22a is open in the top and has flanges 22b, 22b in the open left and right edges.

The left front-panel drive mechanism 38 has a front slider 50, a stay slider 60, a connecting link 70, a stopper member 80, a front panel support stay 90, and a pull arm 100, as shown in FIGS. 5, 6A, and 6B.

The front slider 50 is a member capable of sliding forward and backward in relation to the roof 11, and has a wide plate-shaped slide plate 51 and a long plate-shaped lift guide plate 52. The slide plate 51 is a substantially horizontal flat plate guided by the guide groove 22a to be capable of sliding forward and backward, and the slide plate 51 has an engaging groove 53 at the front part of the top surface. The engaging groove 53 is a groove that is open in the top and that extends in the vehicle width direction. The engaging groove 53 is inclined backward and upward when viewed from the vehicle width direction (in a side view). In the open end of the engaging groove 53, the front edge 53b is set slightly higher than the rear edge 53a.

The lift guide plate 52 is a flat plate erected substantially perpendicular from the slide plate 51, and the lift guide plate 52 extends along the longitudinal direction of the vehicle body. The lift guide plate 52 has a lift guide groove 54 and an arm-securing convexity 55. The lift guide groove 54 is an inclined groove formed in the left or right side surface of the lift guide plate 52, and is formed so as to be long and thin along the longitudinal direction of the vehicle body and to slope downward from the front to the rear. The lift guide groove 54 is a long hole passing through the width direction of the vehicle. The arm-securing convexity 55 is a horizontal member extending sideways from the left or right side surface in the rear end part of the lift guide plate 52.

The stay slider 60 is a member capable of sliding forward and backward in relation to the roof 11, and is disposed in front of the front slider 50. More specifically, the stay slider 60 is a long, thin member extending forward and backward, and is guided to be capable of sliding forward and backward by the guide groove 22a. The stay slider 60 has a linking pin 61, a support concavity 62, and a swing guide groove 63. The linking pin 61 is a horizontal member extending sideways from the left or right side surface in the rear part of the stay slider 60. The support concavity 62 has a groove formed in the front end surface of the stay slider 60, and runs through the width direction of the vehicle. The swing guide groove 63 is an inclined groove formed in the left or right side surface in the stay slider 60, and is formed so as to slope upward from the front to the rear. The swing guide groove 63 may also be a long hole running through the width direction of the vehicle.

The connecting link 70 is a long, thin member extending forward and backward, which is capable of linking the front slider 50 and stay slider 60 together. The connecting link 70 has a first engaging convexity 71, a second engaging convexity 72, and a linking hole 73. The first engaging convexity 71 is a horizontal member extending sideways from the left or right side surface in the lower rear part of the connecting link 70, and is capable of engaging with the engaging groove 53 of the front slider 50. The second engaging convexity 72 is a horizontal member extending sideways from the left or right side surface in the upper rear part of the connecting link 70. The second engaging convexity 72 extends in the same direction as the first engaging convexity 71. The linking hole 73 is a horizontal hole extending to the left and right in the front part of the connecting link 70, and the linking pin 61 of the stay slider 60 fits into the linking hole 73.

The stopper member 80 is a long, thin member extending in the longitudinal direction of the vehicle body, and is disposed behind the front slider 60 and is attached to the left flange 22b. In other words, the stopper member 80 is fixed to the roof 11 (see FIG. 1). The stopper member 80 has a cam groove 81 and a cam nose 82. The cam groove 81 is formed in the bottom surface of the stopper member 80, and opens into the guide groove 22a of the side frame member 22. The cam groove 81 is a horizontal groove running through the width direction of the vehicle, and is formed into a substantially trapezoidal shape having a wide opening when viewed from the vehicle width direction (in a side view). The cam groove 81 can be fitted with the first engaging convexity 71 of the connecting link 70. The cam nose 82 is formed so as to protrude upward from the top surface in the front end part of the stopper member 80. The cam surface (top surface) of the cam nose 82 is capable of engaging with the second engaging convexity 72 of the connecting link 70. More specifically, the cam nose 82 is the part of the stopper member 80 where the front end portion peaks, and is formed so as to slope downward to the rear of this peak.

The front panel support stay 90 is a long, thin member extending in the longitudinal direction of the vehicle body for supporting the front panel 32, and is provided to the roof 11 to be capable of sliding forward and backward and swinging upward and downward. The front panel support stay 90 has a swinging pin 91, a guide pin 92, a lift pin 93, and an engaging pin 94.

The swinging pin 91 is a horizontal member extending sideways from the left and right side surfaces in the front end part of the front panel support stay 90. The swinging pin 91 is supported by being fitted into the support concavity 62 of the stay slider 60.

The guide pin 92 is a horizontal member extending sideways from the left or right side surface in the front panel support stay 90, and is disposed at a position behind the swinging pin 91. The guide pin 92 is fitted into the swing guide groove 63 of the stay slider 60.

The lift pin 93 is a horizontal member extending sideways from the left or right side surface in the front panel support stay 90, and is disposed behind the guide pin 92. The lift pin 93 is fitted into the lift guide groove 54 of the front slider 50 to be capable of moving relative to the lift guide groove 54. Therefore, the lift pin 93 is guided by the lift guide groove 54.

The engaging pin 94 is a horizontal member extending sideways from the left or right side surface in the rear end part of the front panel support stay 90.

The front panel support stay 90 is capable of swinging upward and downward, with the swinging pin 91 at the front end as a swing anchor. When the front slider 50 slides in the longitudinal direction of the vehicle body, the lift pin 93 is guided by the lift guide groove 54, whereby the front panel support stay 90 is swingably driven upward and downward. The configuration combining the lift guide groove 54 and the lift pin 93 constitutes a swing guide mechanism 96. Thus, the front slider 50 can swing the rear end of the front panel support stay 90 upward and downward via the swing guide mechanism 96.

The pull arm 100 is a long, thin member extending in the longitudinal direction of the vehicle body, and the front end part of the arm is secured in the arm-securing convexity 55 of the front slider 50. The rear end part of the pull arm 100 expands upward, and the expanded portion has a pull groove 101. The pull groove 101 runs through the width direction of the vehicle, and the front end of the groove is open. More specifically, the pull groove 101 is an inclined groove formed so as to slope downward from the open front end to the rear, and the engaging pin 94 of the front panel support stay 90 can be fitted into the pull groove 101.

The pull groove 101 has the following two functions. The first function of the pull groove 101 is to support and guide the engaging pin 94 (rear end part of the front panel support stay 90) upward when the front panel 32 is opened and when the rear end of the front panel 32 begins to incline upward.

The second function of the pull groove 101 is to support the engaging pin 94 (rear end part of the front panel support stay 90) while pulling the engaging pin 94 downward when the front panel 32 is closed and when the rear end of the inclined front panel 32 has completely returned to its original substantially horizontal height.

Thus, since the pull groove 101 has the first and second functions, the front panel 32 can be prevented from swaying up and down due to the effects of wind resistance when the front panel 32 is swung upward and downward. Therefore, the swinging action of the front panel 32 can be further stabilized.

The reason that the pull arm 100 is configured as a separate member from the front slider 50 is as follows. Specifically, the front slider 50 slides backward by a large amount when the front panel 32 is slid backward to the fully opened position. Therefore, when the front slider 50 has slid backward, the rear end of the pull arm 100 can come into contact with the rear edge of the opening 21 (see FIG. 1) on the side of the frame. The pull arm 100, having come into contact with the rear edge, can be moved forward against the projecting force of a compression coil spring 102. Therefore, the front slider 50 and the pull arm 100 do not interfere with the rear edge of the opening 21. The front panel 32 can be opened sufficiently. This is the reason that the pull arm 100 is configured from a separate member from the front slider 50.

Next, the operation of the front-panel drive mechanism 38 will be described based on FIGS. 6A through 8B.

FIGS. 6A and 6B show the front-panel drive mechanism 38 when the front panel 32 is in the fully closed state. The front and rear ends of the fully closed front panel 32 are in sealed contact with the front and rear end edges of the opening 12 in the roof 11, as shown in FIGS. 2 and 6A. When the front panel 32 is in a fully closed state, the stay slider 60 is positioned in front of the stopper member 80. At this time, the rear end part 94 of the front panel support stay 90 is at the lowest position. Therefore, the lift pin 93 is positioned at the rear part of the lift guide groove 54, and the engaging pin 94 is positioned at the rear part of the pull groove 101.

The top half of the first engaging convexity 71 fits in the cam groove 81, and the bottom half of the first engaging convexity 71 protrudes downward from the stopper member 80, as shown in FIG. 6B. The connecting link 70 cannot move because the first engaging convexity 71 is locked in the cam groove 81. The second engaging convexity 72 is in proximity to the peak of the cam nose 82. The front slider 50 is in a position near the stay slider 60, and the engaging groove 53 of the front slider 50 is therefore positioned in front of the stopper member 80.

An occupant of the vehicle then performs an opening operation with an operating unit (e.g., an open/close operation switch, not shown) of the sunroof apparatus 30. The electric motor 35 (see FIG. 1) thereupon rotates forward, whereby the front slider 50 is pulled backward (in the direction of the arrow Pr) by the wire cable 37. Consequently, the front slider 50 slides backward. As the front slider 50 retracts, the engaging groove 53 retracts and approaches the first engaging convexity 71, and the lift guide groove 54 and pull groove 101 retract. The lift pin 93 of the front panel support stay 90 is guided upward by the lift guide groove 54. The rear end part of the front panel support stay 90 swings upward, with the 25 swinging pin 91 as a swing anchor. Therefore, the rear end of the front panel 32 swings upward (tilts up). The result is shown in FIGS. 7A and 7B.

FIGS. 7A and 7B show the front-panel drive mechanism 38 when the rear end of the front panel 32 is inclined upward to a specific upper limit (to the "tilting up complete" state). Since the front panel support stay 90 has swung upward, the lift pin 93 is positioned at the front part of the lift guide groove 54, and the engaging pin 94 is positioned above and in front of the pull groove 101. As the front slider 50 retracts, the engaging groove 53 retracts to a position substantially directly below the first engaging convexity 71. The electric motor 35 then slides the front slider 50 further backward via the wire cable 37. As a result, the front edge of the engaging groove 53 comes into contact with the first engaging convexity 71, and the first engaging convexity 71 thereby withdraws from the cam groove 81 and fits into the engaging groove 53. The result is shown in FIGS. 8A and 8B.

FIGS. 8A and 8B show the front-panel drive mechanism 38 when the rear end of the front panel 32 is inclined upward and beginning to move backward. The state of the sunroof panel 31 and front-panel drive mechanism 38 shown in FIG. 8A is substantially the same as the state shown in FIG. 7A described above. The first engaging convexity 71 is separated from the cam groove 81 and fitted into the engaging groove 53, as shown in FIG. 8B. Since the first engaging convexity 71 has separated from the cam groove 81, the connecting link 70 can move forward and backward. When the connecting link 70 has moved backward, the second engaging convexity 72 is capable of moving the peak of the cam nose 82 backward while lowering the peak. The first engaging convexity 71 is linked with the engaging groove 53, whereby the front slider 50 reaches a state of being linked with the stay slider 60 via the connecting link 70.

The electric motor 35 then slides the front slider 50 further backward via the wire cable 37. The stay slider 60 linked to the front slider 50 via the connecting link 70 also slides backward. As a result, the front panel 32 moves backward together with the front slider 50, the stay slider 60, and the front panel support stay 90 until the front panel 32 is fully open. The electric motor 35 (see FIG. 1) stops when the front panel 32 has fully opened.

When the front panel 32 is then in the fully open state, the occupant performs a closing operation with the operating unit of the sunroof apparatus 30. The electric motor 35 (see FIG. 1) then rotates in reverse and pushes the front slider 50 out forward (n the direction of the arrow Pf) via the wire cable 37. Consequently, the front slider 50 slides forward. The stay slider 60 linked to the front slider 50 via the connecting link 70 also slides forward. As a result, the front panel 32 moves forward together with the front slider 50, the stay slider 60, and the front panel support stay 90. At the same time, the first and second engaging convexities 71, 72 in the connecting link 70 also move forward. The result is shown in FIGS. 7A and 7B.

When the first engaging convexity 71 has moved to a position directly below the cam groove 81 as shown in FIGS. 7A and 7B, the second engaging convexity 72 is guided to move forward and upward by the cam nose 82. As a result, the rear end part of the connecting link 70 swings upward, and the first engaging convexity 71 therefore withdraws from the engaging groove 53 of the front slider 50 and fits into the cam groove 81. At this time, the connecting link 70 and the stay slider 60 are released from their connection with the front slider 50. The stay slider 60 continues to be stopped even if the front slider 50 moves farther forward. At the point when the stay slider 60 stops, the front panel support stay 90 and the front panel 32 do not move forward any longer. In other words, the front panel 32 moves forward to its original fully closed position by sliding.

The electric motor 35 (see FIG. 1) then slides the front slider 50 further forward via the wire cable 37. Therefore, the lift guide groove 54 and the pull groove 101 move forward. The lift pin 93 is guided and lowered by the lift guide groove 54. The rear end part of the front panel support stay 90 swings downward, with the swinging pin 91 as a swing anchor. The rear end of the front panel 32 swings downward (tilts down). The result is shown in FIGS. 6A and 6B.

The front panel support stay 90 stops swinging at the point when the lift pin 93 is guided by the lift guide groove 54 and lowered to the lowest end, as shown in FIGS. 6A and 6B. As a result, the front panel 32 returns to the original fully closed state. The electric motor 35 then stops (see FIG. 1).

Figure 9:
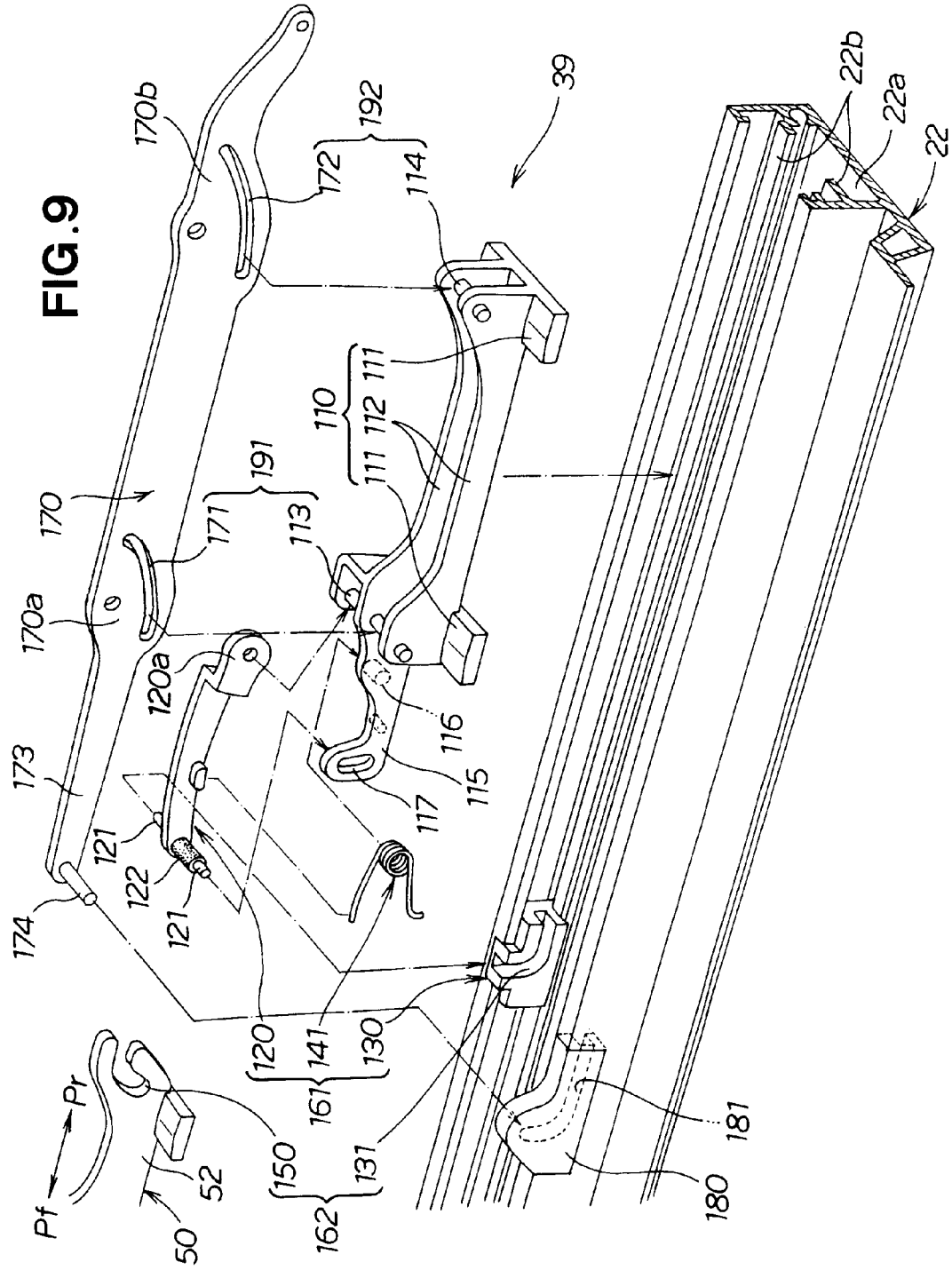
FIG. 9 is an exploded view showing the left rear panel drive mechanism of FIG. 2.

Next, the left side frame member 22 and the left rear panel drive mechanism 39 (see FIG. 2) will be described. The right rear panel drive mechanism 39 has the same configuration (bilaterally symmetric configuration) as the left mechanism and is therefore not described. FIG. 9 shows an exploded view of the left rear panel drive mechanism 39 shown in FIG. 2. FIG. 10 shows the assembled structure of the area surrounding the front part of a rear slider 110 in the rear panel drive mechanism 39 shown in FIG. 2.

When the front panel 32 is in the fully closed state, the front end of the front slider 50 is positioned in a fully closed position FSc, as shown in (a) of FIG. 2. When the rear panel 33 is in the fully closed state, the front end of the rear slider 110 is positioned in a fully closed position RSc.

The left rear panel drive mechanism 39 has the rear slider 110, a swinging member 120, a fixed member 130, an urging member 141, a slider linking part 150, a rear panel support stay 170, and a stopper member 180.

The rear slider 110 is a member capable of sliding forward and backward in relation to the roof 11, and is disposed behind the front slider 50, as shown in (a) of FIG. 2 and also in FIG. 9. This rear slider 110 drives the rear panel support stay 170 to slide forward and backward and to swing up and down in relation to the roof 11. The rear panel support stay 170 is a member for supporting the rear panel 33. The details of the rear panel support stay 170 are described hereinafter.

The rear slider 110 has a pair of front and rear wide plate-shaped sliding plates 111, 111, and a pair of left and right long plate-shaped lift guide plates 112, 112, as shown in FIG. 9.

The front and rear sliding plates 111, 111 are guided to be capable of sliding forward and backward by the guide groove 22a. The left and right lift guide plates 112, 112 are long, thin, flat plates that extend forward and backward and are erected from the sliding plates 111, 111; the lift guide plates 112, 112 have a pair of front and rear pins 113, 114. The front pin 113 disposed in the front part of the lift guide plates 112, 112 and the rear pin 114 disposed in the rear part of the lift guide plates 112, 112 are disposed horizontally so as to extend in the width direction of the vehicle. Either one of the left and right lift guide plates 112, 112 has an extending part 115 that extends toward the front slider 50. The extending part 115 has a spring-securing part 116 extending sideways from the side surface, and a long hole 117 formed in the distal end of the extending part. The long hole 117 is formed to be long and thin in the vertical direction and to pass through sideways.

The swinging member 120 (connecting rod 120) is a long, thin member extending from the rear slider 110 toward the front slider 50 (particularly toward the rear end of the lift guide plate 52) as shown in FIG. 9 and (a) of FIG. 10, and has, e.g., a long, thin, longitudinal plate or a rod-shaped member. More specifically, a proximal end part 120a of the swinging member 120 is linked to the front end part of the rear slider 110 to be capable of swinging up and down by the front pin 113 (Linking pin 113). For example, the front pin 113 is either fitted loosely into the hole in the proximal end part 120a, or the front pin 113 is fitted loosely into the hole in the rear slider 110. It is apparent that the portion where the proximal end part 120a and the rear slider 110 are linked by the front pin 113 has a small gap for fitting the front pin 113 with the hole.

The mass of the swinging member 120 is set to be less than the mass of the front slider 50 and the mass of the rear slider 110.

The swinging member 120 has a pin 121 (swinging pin 121) in the distal end of the swinging portion. This swinging pin 121 is disposed parallel to the front pin 113, the swinging pin passes through the swinging member 120 and extends both to the left and to the right, and one extended portion of the swinging pin is covered by a buffer member 122. The buffer member 122 has a pipe made of, e.g., rubber or another such elastic material. The swinging pin 121 is fitted into the long hole 117 in the rear slider 110 via the buffer member 122. As a result, the swinging member 120 is capable of swinging up and down within the range allowed by the long hole 117. The swinging pin 121 is hereinbelow described while being alternatively referred to appropriately as the "swinging distal end part 121" or the "distal end part 121."

The fixed member 130 is fixed to the roof 11 via the left side frame member 22 by being attached to the right flange 22b, as shown in (a) and (b) of FIG. 2, FIG. 9, and (b) of FIG. 10. The fixed member 130 is positioned behind the position of the front slider 50 when the front panel 32 is in the fully closed state. Moreover, the fixed member 130 is positioned in front of the position of the rear slider 110 when the rear panel 33 is in the fully open state. The fixed member 130 is a long plate-shaped member, and has a rod-locking part 131. The rod-locking part 131 holes the swinging distal end part 121 of the swinging member 120 in a locked state when the rear panel 33 (see FIG. 2) is in the fully closed state.

The rod-locking part 131 has a cam groove formed in the side surface of the fixed member 130 facing the guide groove 22a. The rod-locking part 131 is described hereinbelow while being referred to alternatively as the "locking cam groove 131," the "locking groove 131," or the "holding groove 131" as appropriate. The locking cam groove 131 is configured to allow the swinging distal end part 121 of the swinging member 120 to be locked therein and to allow the distal end part 121 to be displaced from a locked state to a released state.

The overall shape of the locking cam groove 131 is a substantially arched shape when viewed from the side (vehicle width direction). In other words, the locking cam groove 131 is a substantially arcuate groove, one end 132 (rear end 132) of which is opened so as to face toward the swinging distal end part 121. More specifically, the one end 132 of the locking cam groove 131 is opened so as to allow the swinging distal end part 121 to enter and withdraw. The other end 133 (top end 133) of the locking cam groove 131 is either opened or closed, and is positioned higher than the one end 132. The locking cam groove 131 has a substantially level horizontal groove part 134 communicated with the open one end 132, an arcuate corner groove part 135 communicated with the horizontal groove part 134 and curved and extended upward, and a substantially oblong vertical groove part 136 communicated with the corner groove part 135 and extended to the other end 133. The swinging member 120 can be secured in the locking cam groove 131 at the swinging distal end part 121.

The urging member 141 is a member for urging the swinging member 120 up (upward) to secure the swinging member in the locking cam groove 131, and has, e.g., a "torsion coil spring" secured on the spring-securing part 116 of the rear slider 110.

The assembled structure of the swinging member 120, the fixed member 130, and the urging member 141 constitutes a rear fully closed lock part 161, as shown in FIG. 9. The rear fully closed lock part 161 locks the rear slider 110 so as to hold the slider in a stopped state at a specific fully closed position RSc (see (b) of FIG. 10).

The front slider 50 is configured so that upon moving from the fully closed position FSc (see (a) of FIG. 2) in the opening direction Pr to a specific half-open position FSh (see (a) OF FIG. 3), the front slider links with the swinging distal end part 121 of the swinging member 120 and then releases the swinging distal end part 121 from being locked in the locking cam groove 131 (rod-locking part 131), as shown in FIGS. 2 and 3. Specifically, the front slider 50 has a slider-linking part 150 as shown in FIGS. 9 and 10. The slider-linking part 150 has a cam groove provided at the rear distal part of the lift guide plate 52 in the front slider 50. The slider-linking part 150 is hereinbelow described while appropriately being referred to alternatively as the "slider-side cam groove 150" or the "linking groove 150."

When the front slider 50 moves from the fully closed position FSc (see FIG. 2) in the opening direction Pr to a specific half-open position FSh (see FIG. 3), the slider-side cam groove 150 links with the swinging distal end part 121 of the swinging member 120 locked in the locking cam groove 131 and guides the swinging distal end part 121 in a direction that releases this part from the locking cam groove 131.

The overall shape of the slider-side cam groove 150 is a substantially arched shape (arcuate shape) when viewed from the side (vehicle width direction), as shown in FIG. 10, and is roughly a vertical inversion of the shape of the locking cam groove 131. One end 151 (rear end 151) of the slider-side cam groove 150 is opened toward the swinging distal end part 121.

The swinging distal end part 121 can enter and withdraw from the one end 151. The other end 152 (bottom end 152) of the slider-side cam groove 150 is closed off. The other end 152 is set at a lower position than the one end 151, and is set at the same height as the one end 132 and horizontal groove part 134 of the locking cam groove 131.

More specifically, the slider-side cam groove 150 has a substantially level horizontal groove part 153 communicated with the open one end 151, an arcuate corner groove part 154 curved and extended downward from the horizontal groove part 153, and a substantially oblong vertical groove part 155 extended from the corner groove part 154 to the other end 152.

Next, the engagement relationship between the front slider 50 and the rear slider 110 will be described. At this time, the front panel 32 and the rear panel 33 are in the fully closed state, as shown in FIG. 2. In this state, the front end of the front slider 50 is in the fully closed position FSc, and the front end of the rear slider 110 is in the fully closed position RSc. In FIG. 10, (b) corresponds to (b) of FIG. 2.

In this state, the swinging member 120 is urged by the urging member 141, as shown in FIG. 10. The swinging distal end part 121 fits into the vertical groove part 136 of the locking cam groove 131. In other words, the swinging distal end part 121 is held in a state of being locked (in a locked state) in the locking cam groove 131. Therefore, the swinging member 120 cannot move forward or backward. Moreover, the swinging distal end part 121 is in contact with the top end of the long hole 117, and is therefore restricted from swinging upward any further. The position Sro where the swinging distal end part 121 is locked by being secured in the vertical groove part 136 of the locking cam groove 131 is hereinbelow referred to as the "locked position Sro."

The front slider 50 then slides in the opening direction (direction of arrow Pr) from the fully closed position FSc shown in (a) of FIG. 2, and reaches the locked position Sro shown in FIG. 2B. The state in which the front slider 50 has reached the locked position Sro is shown by the imaginary lines in (c) of FIG. 10. At this time, the swinging distal end part 121 enters the one end 151 of the slider-side cam groove 150.

FIGS. 3 and 11 show the state in which the front slider 50 has then slid further in the opening direction and reached the half-open position FSh. In FIG. 11, (b) corresponds to (b) of FIG. 3. In FIG. 11, (c) corresponds to (c) of FIG. 3.

When the front slider 50 has reached the half-open position FSh, the slider-side cam groove 150 first links with the swinging distal end part 121, and then guides the swinging distal end part 121 immediately thereafter to a released state away from the state of being locked in the locking cam groove 131. The swinging member 120 swings downward toward the lower end of the long hole 117 against the urging force of the urging member 141.

In other words, the front slider 50 moves in the direction of the arrow Pr, whereby the arcuate corner groove part 154 in the slider-side cam groove 150 guides the swinging distal end part 121 downward. The swinging member 120 swings downward. As a result, the swinging distal end part 121 is displaced from the horizontal groove part 153 to the vertical groove part 155 in the slider-side cam groove 150. At nearly the same time, the swinging distal end part 121 is displaced from the vertical groove part 136 to the horizontal groove part 134 in the locking cam groove 131, as shown in (b) of FIG. 11. Therefore, the rear slider 110 is linked with the front slider 50, and the locked state of the rear fully closed lock part 161 is then immediately released. In this state, the swinging distal end part 121 is slightly lower than being horizontally level, as shown in (c) of FIG. 11.

Thus, the timing by which the slider linking part 150 links with the swinging distal end part 121 is set to precede the timing by which the slider-side cam groove 150 releases the swinging distal end part 121 from being locked in the locking cam groove 131. The position Sun at which the swinging distal end part 121 is fitted and unlocked in the horizontal groove part 134 of the locking cam groove 131 is hereinbelow referred to as the "unlocked position Sun."

The front slider 50 then slides further in the opening direction, whereby the front slider 50 sidably drives the rear slider 110 backward via the swinging member 120 and the front pin 113. FIG. 12 shows the result of the front slider 50 moving further in the opening direction.

FIG. 12 shows a state in which the front slider 50 has slid further in the opening direction from the half-open position FSh (see FIG. 3). The swinging distal end part 121 withdraws from the one end 132 of the locking cam groove 131, as shown in (b) of FIG. 12.

As shown in FIG. 4, the front slider 50 then slides to a fully open position FSo to cause the rear slider 110 to slide to a fully open position RSo as well. The front slider 50 stops at the fully open position FSo, and the rear slider 110 thereby stops at the fully open position RSo. The swinging distal end part 121 maintains a state of being linked with the slider-side cam groove 150, as shown in (c) of FIG. 12.

When the front slider 50 thereafter returns in the closing direction (direction of arrow Pf) from the fully open position FSo as shown in FIG. 4, the rear slider 110 is pulled by the front slider 50 to slide in the opening direction, as shown in (c) of FIG. 12. As a result, the swinging distal end part 121 enters the one end 132 of the locking cam groove 131 shown in (b) of FIG. 12. Thus, the slider-side cam groove 150 guides the swinging distal end part 121 so as to enter into the locking cam groove 131. The result is shown in FIGS. 3 and 11.

The front slider 50 then slides further in the closing direction, whereby the rear slider 110 also slides in the closing direction. Therefore, the slider-side cam groove 150 guides the swinging distal end part 121 fitted in the locking cam groove 131 further forward. The swinging distal end part 121 advances from the locking cam groove 131 through the horizontal groove part 134 to the corner groove part 135. Having reached the corner groove part 135, the swinging distal end part 121 is guided further forward by the slider-side cam groove 150. At this time, the swinging distal end part 121 is raised by the urging force of the urging member 141 while being guided by the corner groove part 135. In other words, the swinging member 120 swings upward. When the swinging member 120 has swung upward by a specified swing angle, the swinging distal end part 121 is positioned at the one end 151 of the slider-side cam groove 150 and enters the vertical groove part 136 in the locking cam groove 131. The result is shown in FIG. 10.

The swinging distal end part 121 separates from the slider-side cam groove 150 and is restricted (locked) from moving forward or backward by the locking cam groove 131, as shown in FIG. 10. In other words, the locking cam groove 131 guides the swinging distal end part 121 in the locking cam groove 131 so that the swinging distal end part 121 withdraws from the slider-side cam groove 150 and moves into a locked state.

Thus, when the front slider 50 moves in the closing direction from the fully open position FSo and returns to the half-open position FSh, the rear slider 110 separates from the front slider 50, and the rear fully closed lock part 161 then immediately returns to the original locked state thereof. The front slider 50 alone then returns to the fully closed position FSc (see FIG. 2), and the front panel 32 is returned to its fully closed state.

The assembled structure of the locking cam groove 131 and the slider-side cam groove 150 constitutes a slider-separating part 162, as shown in FIG. 9. In other words, the slider-separating part 162 is configured by combining the locking cam groove 131 and the slider-side cam groove 150. When the front slider 50 moves from the fully open position FSo (see FIG. 4) in the closing direction and returns to the half-open position FSh (see FIG. 3), the slider-separating part 162 separates the rear slider 110 from the front slider 50 and returns the rear fully closed lock part 161 to the original locked state thereof.

A summary of the above description is as follows. When the front slider 50 moves from the fully closed position FSc (see FIG. 2) in the opening direction Pr and retracts to the half-open position FSh (see FIG. 3), the slider-linking part 150 (slider-side cam groove 150) links the rear slider 110 to the front slider 50 and releases the rear fully closed lock part 161 from the locked state thereof. Specifically, the front slider 50 links with the swinging distal end part 121 of the swinging member 120 (distal end part 121 of the linking rod 120) and then releases the swinging distal end part 121 from a state of being locked with the rod-locking part 131. As a result, the front slider 50 links with the swinging distal end part 121 and releases the swinging distal end part 121 from the state of being locked with the rod-locking part 131.

Consequently, the front slider 50 and the rear slider 110 can directly engage each other and retract to the fully open positions FSo, RSo (see FIG. 4). Therefore, the half-open front panel 32 and the fully closed rear panel 33 can directly engage each other and be opened to the fully open positions FPo, RPo.

When the front slider 50 has advanced from the fully open position FSo (see FIG. 4) to the half-open position FSh (see FIG. 3), the slider-separating part 162 separates the rear slider 110 from the front slider 50 and returns the rear fully closed lock part 161 immediately thereafter to the original locked position thereof. As a result, the rear slider 110 separates from the front slider 50 and stops. Thereafter, the front slider 50 alone advances further to the fully closed position FSc (see FIG. 2). Therefore, the front panel 32 can be closed alone to the fully closed position FPc while the fully closed rear panel 33 remains stopped.

Thus, since the sunroof apparatus 30 is provided with the slider-linking part 150 and the slider-separating part 162, the rear slider 110 can be directly engaged relative to the action of the front slider 50 with good timing, and can also be released with good timing. As a result, the front panel 32 and the rear panel 33 can directly engage each other with good timing, and can also be released with good timing. Furthermore, the engagement between the front panel 32 and the rear panel 33 can be maintained over a long period of time in a more appropriate state, regardless of the state of the wire cables 37 (see FIG. 1) for driving the panels. Moreover, this result can be achieved by a simple configuration in which only the slider-linking part 150 and the slider-separating part 162 are provided.

As is clear from the above description, the timing by which the slider-linking part 150 is linked to the swinging distal end part 121 is set to precede the timing by which the slider-linking part 150 releases the swinging distal end part 121 from being locked in the locking cam groove 131. As a result, after the front slider 50 is linked with the rear slider 110 by the swinging member 120, the rear slider 110 switches to a state in which the roof can be opened. The front slider 50 and the rear slider 110 can be directly engaged with each other in a reliable manner and with good timing. Consequently, the half-open front panel 32 and the fully closed rear panel 33 can be directly engaged with each other in a reliable manner and with good timing, and both panels 32, 33 can be opened to their fully open positions.

Furthermore, the slider-linking part 150 has a simple configuration composed merely of the slider-side cam groove 150 provided to the front slider 50, as shown in FIG. 9. The slider-separating part 162 has a simple configuration including the slider-side cam groove 150 of the slider-linking part 150 and the locking cam groove 131 of the rear fully closed lock part 161. Therefore, the engagement between the front panel 32 and the rear panel 33 can be maintained for a long period of time in a more appropriate state by using an extremely simple configuration having a small number of components.

Furthermore, the engagement between the front panel 32 and the rear panel 33 can be maintained for a long period of time in a more appropriate state by an extremely simple configuration obtained merely by combining the swinging member 120 extending from the rear slider 110 toward the front slider 50, the substantially arcuate locking cam groove 131 in which one end 132 is opened toward the swinging distal end part 121, and the substantially arcuate slider-side cam groove 150 in which one end 151 is opened toward the swinging distal end part 121, as shown in FIG. 10.

Specifically, a combination is obtained using the "locking cam groove 131" constituting the rod-locking part 131, the "slider-side cam groove 150" in the front slider 50, and the "swinging distal end part 121 of the swinging member 120" fitted in these cam grooves 131 150. The locking cam groove 131 is a groove for allowing the swinging distal end part 121 to be displaced between the locked state and the released state. The slider-side cam groove 150 is a groove for linking with the swinging distal end part 121 and guiding the swinging distal end part 121 out of being locked in the locking cam groove 131 to a released state when the front slider 50 moves from the fully closed position FSc in the opening direction Pr and reaches a specific half-open position FSh.

Thus, the engagement between the front panel 32 and the rear panel 33 can be maintained over a long period of time in an appropriate state by a simple configuration obtained by merely combining the "locking cam groove 131," the "slider-side cam groove 150," and the "swinging distal end part 121" capable of fitting with these two cam grooves 131, 150.

Furthermore, the mass of the swinging member 120 is set to be less than the mass of the front slider 50 or the mass of the rear slider 110. Moreover, the mass of the front panel 32 is added to the mass of the front slider 50 for opening and closing the front panel 32. The mass of the rear panel 33 is added to the mass of the rear slider 110 for opening and closing the rear panel 33. It is apparent that the linking portion where the rear slider 110 and the proximal end part 120*a* of the swinging member 120 are linked (the portion linked by the linking pin 113) has a small gap to allow for fitting.

When the front slider 50 retracts from the fully closed position FSc (see FIG. 2) to the half-open position FSh (see FIG. 3), the front slider 50 comes into contact with the swinging distal end part 121. Since the swinging member 120 is small in mass, the force of impact is small when the front slider 50 comes into contact with the swinging distal end part 121. Therefore, impact noise can be suppressed. As a result, since the operating noise of the sunroof apparatus 30 can be suppressed, the interior of the passenger compartment can be kept quieter.

Figure 14:
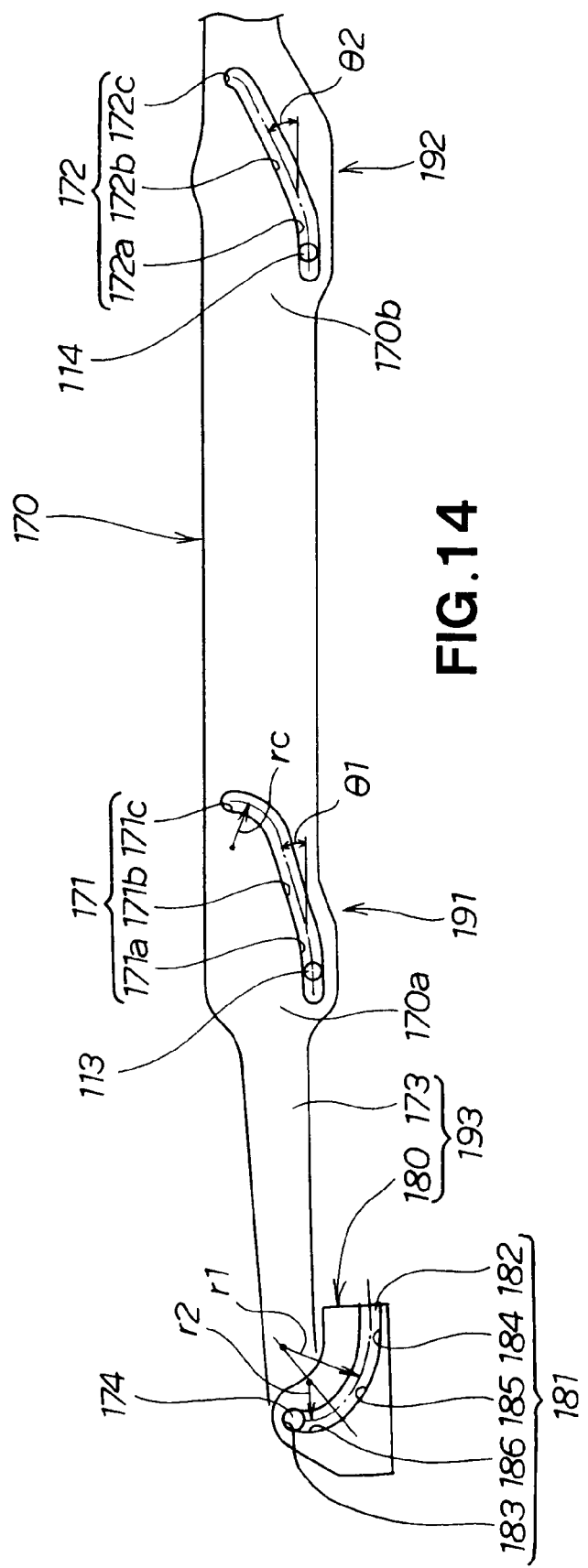
FIG. 14 is a diagrammatical view illustrating the general arrangement of the vicinity of the rear panel support stay and the stopper member of FIG. 13A.

Next, the relationship between the rear slider 110, the rear panel support stay 170, and the stopper member 180 in the left rear panel drive mechanism 39 will be described. FIG. 13A shows the left rear panel drive mechanism 39 when the rear panel 33 is in the fully closed state. FIG. 13B shows the process by which the rear panel 33 opens. FIG. 13C shows the left rear panel drive mechanism 39 when the rear panel 33 has completely lowered. FIG. 14 shows a partial view of the vicinity of the rear panel support stay 170 and the stopper member 180.

The rear panel drive mechanism 39 lowers the rear end part 33b of the rear panel 33 to the inside surface 11b of the roof 11 ahead of the front end part 33a of the rear panel 33 when the fully closed rear panel 33 is opened, as shown in FIG. 13. In other words, as the rear panel drive mechanism 39 lowers the rear end part 33b of the rear panel 33, the rear panel drive mechanism 39 retracts the rear end part 33b along the inside surface 11b of the roof 11.

The rear panel support stay 170 has a long, thin, oblong flat plate extending forward and backward, and has a pair of front and rear cam grooves 171, 172 in the side surface of a front end part 170a and the side surface of a rear end part 170b, as shown in FIGS. 9, 13A, and 14.

The front and rear cam grooves 171, 172 have long, thin, oblong holes extending forward and backward, and run to the left and right through the rear panel support stay 170. The cam grooves 171, 172 are closed at both longitudinal ends. The first cam groove 171 is formed in the front end part 170a and fits with the front pin 113 (linking pin 113, guide pin 113) of the rear slider 110. The second cam groove 172 is formed in the rear end part 170b and fits with the rear pin 114 (guide pin 114) of the rear slider 110.

The front pin 113 is a member for linking the proximal end part 120a of the swinging member 120 with the rear slider 110, but also functions as a member for linking the rear panel support stay 170 with the rear slider 110. Therefore, a separate linking member is not needed in order to link the rear panel support stay 170 with the rear slider 110. The number of components can be reduced, the linking configuration for the rear panel support stay 170 can be simplified, and the rear slider 110 can be reduced in size. Furthermore, when the front slider 50 retracts from the fully open position and pushes the swinging distal end part 121 of the swinging member 120 as shown in FIG. 9, this "push force" is transferred from the proximal end part 120a of the swinging member 120 via the front pin 113 to the rear panel support stay 170. Since the push force acting on the front pin 113 is transferred directly from the front pin 113 to the rear panel support stay 170, the force transmission is highly efficient, which is beneficial in terms of increasing the rigidity of the rear slider 110.

The first cam groove 171 has a first horizontal groove part 171a, a first inclined groove part 171b, and a first vertical groove part 171c, as shown in FIG. 14. These groove parts 171a through 171c are continuous. The first horizontal groove part 171a is located in the front part of the first cam groove 171 and is roughly horizontally level. The first inclined groove part 171b extends while curving backward and upward from the rear end of the first horizontal groove part 171a. The first vertical groove part 171c extends while curving upward from the rear end of the first inclined groove part 171b.

The second cam groove 172 has a second horizontal groove part 172a, a second inclined groove part 172b, and a second vertical groove part 172c. These groove parts 172a through 172c are continuous. The second horizontal groove part 172a is located in the front part of the second cam groove 172 and is roughly horizontally level. The second inclined groove part 172b extends while curving backward and upward from the rear end of the second horizontal groove part 172a. The second vertical groove part 172c extends while curving upward from the rear end of the second inclined groove part 172b.

The overall shapes and dimensions of the first cam groove 171 and the second cam groove 172 are substantially the same, but differ greatly in the following respects. The angle of inclination θ1 of the first inclined groove part 171b is less than the angle of inclination θ2 of the second inclined groove part 172b. In the first cam groove 171, the curved corner portion between the rear end of the first inclined groove part 171b and the bottom end of the first vertical groove part 171c has a large curve with a radius rc. The curvature of the corner portion in the second cam groove 172 is smaller.

Furthermore, the rear panel support stay 170 has a stay extension 173 extending from the front end, i.e., from the front end part 170a toward the front panel 32 (particularly, toward the rear end of the lift guide plate 52 in the front slider 50). The stay extension 173 has a pin 174 in the distal end portion. This pin 174 is disposed parallel to the front pin 113. The pin 174 is hereinbelow described while being alternatively referred to as the "distal end part 174 of the stay extension 173" as appropriate.

The stopper member 180 is disposed at a position in front of the rear panel 33 when the rear panel 33 is fully closed (a position near the front panel 32), and the stopper member 180 is attached to the left flange 22b. The stopper member 180 is provided to the roof 11 via the left side frame member 22. The stopper member 180 is a plate-shaped member, and has a guide groove 181 in the side surface facing toward the guide groove 22a. The guide groove 181 secures and guides the distal end part 174 of the stay extension 173.

The overall shape of the guide groove 181 is a substantially arched shape when viewed from the side (vehicle width direction), as shown in FIG. 14. In other words, the guide groove 181 is a substantially arcuate groove, one end 182 (rear end 182) of which is opened so as to face toward the distal end part 174. More specifically, the one end 182 of the guide groove 181 is opened so as to allow the distal end part 174 to enter and withdraw when the front end part 33a of the rear panel 33 has been lowered. The other end 183 (top end 183) of the guide groove 181 is disposed at a higher position than the one end 182 of the guide groove 181, and is closed so as to restrict the distal end part 174 from rising when the rear panel 33 (see FIG. 2) is in the fully closed state.

The guide groove 181 has a substantially level horizontal groove part 184 communicated with the open one end 182, an arcuate corner groove part 185 communicated with the horizontal groove part 184 and extended while curving upward, and a substantially oblong vertical groove part 186 communicated with the corner groove part 185 and extending to the other end 183. The corner groove part 185 is set so as to have a large radius r1 in the lower half connected to the horizontal groove part 184, and a small radius r2 in the upper half connected to the vertical groove part 186.

The assembled structure of the front pin 113 and the first cam groove 171 constitutes a first rear stay engagement part 191, as shown in FIGS. 13A and 14. The assembled structure of the rear pin 114 and the second cam groove 172 constitutes a second rear stay engagement part 192. The first and second rear stay engagement parts 191, 192 engage the rear panel support stay 170 so that the stay is retracted while being lowered in accordance with the retracting of the rear slider 110.

The assembled structure of the stay extension 173 and the stopper member 180 constitutes a restricting part 193. When the rear end part 170b of the rear panel support stay 170 retracts while being lowered, the restricting part 193 restricts the front end part 170a of the rear panel support stay 170 so that the front end part 170a retracts while being lowered after the rear end part 170b of the rear panel support stay 170. The restricting part 193 furthermore restricts the swinging upper limit of the stay extension 173.

Next, the operational relationship of the rear slider 110, the rear panel support stay 170, and the stopper member 180 will be described (see FIGS. 13A through 13C and FIG. 14).

When the rear panel 33 is in the fully closed state, the front pin 113 of the rear slider 110 fits into the first horizontal groove part 171a of the first cam groove 171, as shown in FIGS. 13A and 14. The rear pin 114 of the rear slider 110 also fits into the second horizontal groove part 172a of the second cam groove 172. The distal end part 174 of the rear panel support stay 170 fits into the vertical groove part 186 of the guide groove 181 and is restricted from swinging upward by the closed other end 183 (closed end 183).

The rear slider 110 is then moved backward, and the front pin 113 and rear pin 114 are thereby also moved backward. The angle of inclination θ1 of the first inclined groove part 171b is less than the angle of inclination θ2 of the second inclined groove part 172b. Therefore, as the rear slider 110 moves backward, the rear panel support stay 170 is guided by the front and rear pins 113, 114, and the rear end part 170b tends to retract while being lowered ahead of the front end part 170a. Moreover, the restricting part 193 restricts the front end part 170a so as to lower and retract the front end part 170a behind the rear end part 170b.

Therefore, the backward movement of the rear slider 110 causes the rear end part 170b to retract while being lowered to a point below the roof 11 ahead of the front end part 170a. Consequently, when the fully closed rear panel 33 is opened as shown in FIG. 13B, the rear end part 33b of the rear panel 33 is lowered ahead of the front end part 33a of the rear panel 33. Furthermore, since the distal end part 174 of the rear panel support stay 170 is restricted from swinging upward by the restricting part 193, the front end part 33a of the rear panel 33 does not rise when the rear end part 33b of the rear panel 33 lowers. The rear panel 33 is then lowered to the inside surface 11b of the roof 11, as shown in FIG. 13C. At this time, the rear end part 33b of the rear panel 33 has moved in farther backward than the rear edge of the opening 12. When the downward movement is complete, the front and rear pins 113, 114 of the rear slider 110 fit with the vertical groove parts 171c, 172c (see FIG. 14) of the first and second cam grooves 171, 172. The distal end part 174 of the rear panel support stay 170 withdraws from the one end 182 of the guide groove 181.

The rear slider 110 moves further backward, whereby the rear panel support stay 170 is also moved backward. As a result, the rear panel 33 moves backward along the inside surface 11b of the roof 11 and opens.

The rear slider 110 is then moved forward, whereby the rear panel support stay 170 is also moved forward. As a result, the rear panel 33 moves forward along the inside surface 11b of the roof 11 and returns to the state shown in FIG. 13C. In other words, only the rear end part 33b of the rear panel 33 has moved in farther backward than the rear edge of the opening 12. At this time, the distal end part 174 of the rear panel support stay 170 enters the one end 182 of the guide groove 181.

The rear slider 110 moves further forward, whereby the distal end part 174 of the rear panel support stay 170 is guided by the guide groove 181 to move forward and upward. At this time, the rear panel support stay 170 is guided by the front and rear pins 113, 114, and the front end part 170a advances while rising ahead of the rear end part 170b. Consequently, the front end part 33a rises ahead of the rear end part 33b when the rear panel 33 is closed, as shown in FIG. 13B. The result of the rear panel 33 having risen completely is that the rear panel 33 returns to the fully closed state in FIG. 13A.

A summary of the above description is as follows. When the fully closed rear panel 33 is opened, the rear panel drive mechanism 39 can retract the rear end part 33b of the rear panel 33 along the inside surface 11b of the roof 11 while lowering the rear end part 33b ahead of the front end part 33a of the rear panel 33, as shown in FIGS. 13A through 13C. The rear end part 33b of the rear panel 33 can therefore be retracted along the inside surface 11b of the roof 11 while being lowered. As a result, the rear panel 33 can be retracted with an earlier timing. Consequently, the rear end part 33b of the rear panel 33 can be brought into the inside surface 11b of the roof 11 in a shorter amount of time than in cases in which the entire rear panel 33 is retracted after being lowered. Furthermore, when the rear end part 33b of the rear panel 33 is lowered, the front end part 33a of the rear panel 33 can be restricted by the restricting part 193 so as not to rise. Thus, by bringing the rear end part 33b of the rear panel 33 into the inside surface 11b of the roof 11 in a short amount of time, and by restricting the front end part 33a of the rear panel 33 so as not to rise, the front panel 32 and the rear panel 33 are prevented from interfering with each other, and the opening 12 can be opened and closed quickly and widely.

The following is a more detailed description of the foregoing. The rear panel drive mechanism 39 raises and lowers, and also opens and closes, the rear panel 33 in relation to the opening 12. The rear panel drive mechanism 39 includes a restricting part 193 for restricting the front end part 33a of the rear panel 33 from rising when the rear end part 33b of the fully closed rear panel 33 lowers. The rear panel 33 can therefore be raised and lowered, and also opened and closed, by the rear panel drive mechanism 39 in relation to the opening 12 in the roof 11. While the fully closed front panel 32 is inclined upward at the rear end and retracting along the outside surface 11a of the roof 11, the fully closed rear panel 33 retracts along the inside surface 11b of the roof 11. At this time, the front end part 33a of the rear panel 33 is restricted by the restricting part 193 (panel front end rise-restricting part 193) so as not to rise. In other words, the front end part 33a of the rear panel 33 does not rise when the rear end part 33b of the rear panel 33 is lowered. Commensurate with the lack of rising in the front panel 32, there is no concern over the front panel 32 coming into contact with the rear panel 33 even if the front panel 32 is retracted excessively. Therefore, the rear panel 33 can begin to open at the point when the retracting front panel 32 comes into proximity to the front end part 33a of the rear panel 33. In other words, the timing by which the rear panel 33 begins to open can be delayed to a degree commensurate with the lack of rising in the front end part 33a of the rear panel 33. By delaying the timing of the start of opening, the front panel 32 and the rear panel 33 can be made to simultaneously reach their specific fully open positions. Since both the front panel 32 and the rear panel 33 can be fully opened, a large opening 12 can be opened widely. As a result, when the sunroof panel 31 is fully open, the amount by which it is open is enlarged.

Furthermore, the restricting part 193 has a simple configuration composed of a combination of the stay extension 173 provided to the rear panel support stay 170 for supporting the rear panel 33, and the stopper member 180 for regulating the upper limit when the stay extension 173 swings upward. The front end part 33a of the rear panel 33 can be reliably restricted from rising by the simply configured restricting part 193. Moreover, the stopper member 180 is provided to the roof 11 at a position farther forward than the rear panel 33 in the fully closed state. Therefore, the front end part 33a of the rear panel 33 can be restricted from rising in an even more reliable manner.

Furthermore, when the rear panel 33 is in the fully closed state, the stopper member 180 restricts the stay extension 173 from swinging upward, and also restricts the stay extension 173 from sliding forward and backward. The stopper member 180 allows the stay extension 173 to slide forward and backward when the front end part 33a of the rear panel 33 has been lowered. Consequently, when the rear panel 33 is in the fully closed state, the stopper member 180 regulates the swinging upper limit of the stay extension 173 and also restricts the stay extension 173 from sliding forward and backward. Therefore, the front end part 33a of the rear panel 33 can be reliably kept in the fully closed state. The stay extension 173 can freely slide forward and backward when the front end part 33a of the rear panel 33 has lowered. Therefore, the opening 12 can be smoothly opened and closed by sliding the rear panel 33 forward and backward.

Furthermore, the stopper member 180 has a substantially arcuate guide groove 181 for guiding the distal end part 174 of the stay extension 173. In the substantially arcuate guide groove 181, the closed other end 183 (closed end 183) is disposed at a higher position than the open one end 182 (open end 182). Therefore, when the rear panel 33 is in the fully closed state, the distal end part 174 is restricted from rising and sliding forward and backward by the closed end 183. When the front end part 33a of the rear panel 33 is in the lowered state, the distal end part 174 can freely enter and exit the open end 182. The rear panel 33, having left the open end 182, can then slide forward and backward along the inside surface 11b of the roof 11. Furthermore, the distal end part 174 can be moved extremely smoothly by the substantially arcuate guide groove 181 from the closed end 183 at the upper limit position toward the open end 182 at the lower limit position. Thus, the front end part 33a of the rear panel 33 can open and close smoothly with an extremely simple configuration in which the distal end part 174 of the stay extension 173 is guided by the substantially arcuate guide groove 181 whose top end is closed.

Furthermore, as described above, when the fully closed rear panel 33 is opened, the rear panel drive mechanism 39 can retract the rear end part 33b along the inside surface 11b of the roof 11 while lowering the rear end part 33b ahead of the front end part 33a. Therefore, the rear end lowering time Tmd (not shown) can be shortened, which is the time taken by the rear end part 33b of the fully closed rear panel 33 to move from the lowering start time Ts (not shown) at which lowering begins, to the lowering end time Te (not shown) at which the rear end part 33b enters the inside surface 11b of the roof 11, as shown in FIG. 13B. In other words, the rear end part 33b of the rear panel 33 can enter the inside surface 11b of the roof 11 in a shorter amount of time than in cases in which the entire rear panel 33 is lowered all at once and then retracted, which has conventionally been the case.

Generally, the lowering speed of the rear panel 33 can be reduced in order to reduce the load on the electric motor 35. However, in cases in which the lowering speed is reduced, the rear panel 33 takes longer to be lowered. To overcome this problem, in the present invention, the increased lowering time of the rear panel 33 is compensated for by reducing the rear end lowering time Tmd. In other words, when the lowering end time Te is used as a reference, the lowering start time Ts can be delayed proportionate to the shortening of the rear end lowering time Tmd. Consequently, there is no concern over the retracting front panel 32 coming into contact with the lowering rear panel 33 even if the lowering start timing of the rear panel 33 is not advanced. Since the lowering start timing of the rear panel 33 is not advanced, the timing at which the rear panel 33 reaches the fully open position RPo is not advanced. The front panel 32 also reaches the fully open position FPo at the point when the rear panel 33 reaches the fully open position RPo. Since the front panel 32 and the rear panel 33 can both be fully opened, the opening 12 can be opened widely despite being large. As a result, the fully open sunroof panel 31 is opened in a greater amount, which will seem more expansive and refreshing to the vehicle occupants. Moreover, despite being large, the opening 12 can be opened and closed to the fully open and fully closed states quickly and in a reliable manner. Furthermore, since the lowering speed and raising speed of the rear panel 33 can be reduced, the load on the electric motor 35 can be reduced as well.

Furthermore, the rear panel drive mechanism 39 has a simple configuration composed of a combination of the rear slider 110, the rear panel support stay 170, the rear stay engagement parts 191, 192, and the restricting part 193. This simply configured rear panel drive mechanism 39 makes it possible for the rear panel 33 to be lowered and retracted quickly and in a reliable manner.

Furthermore, the rear stay engagement parts 191, 192 have extremely simple configurations composed of the guide pins 113, 114 and the cam grooves 171, 172. These extremely simply configured rear stay engagement parts 191, 192 make is possible for the rear panel support stay 170 to be engaged so as to be lowered and retracted in accordance with the retracting of the rear slider 110.

Furthermore, the restricting part 193 has a stay extension 173 extending forward from the front end of the rear panel support stay 170, and a stopper member 180 provided on the roof 11 at a position in front of the rear panel 33 in the fully closed state. The stopper member 180 has a guide groove 181 for guiding the distal end part 174 of the stay extension 173. The front end part 170a of the rear panel support stay 170 can be lowered and retracted after the rear end part 170b by this extremely simply configured restricting part 193.

Figure 15:
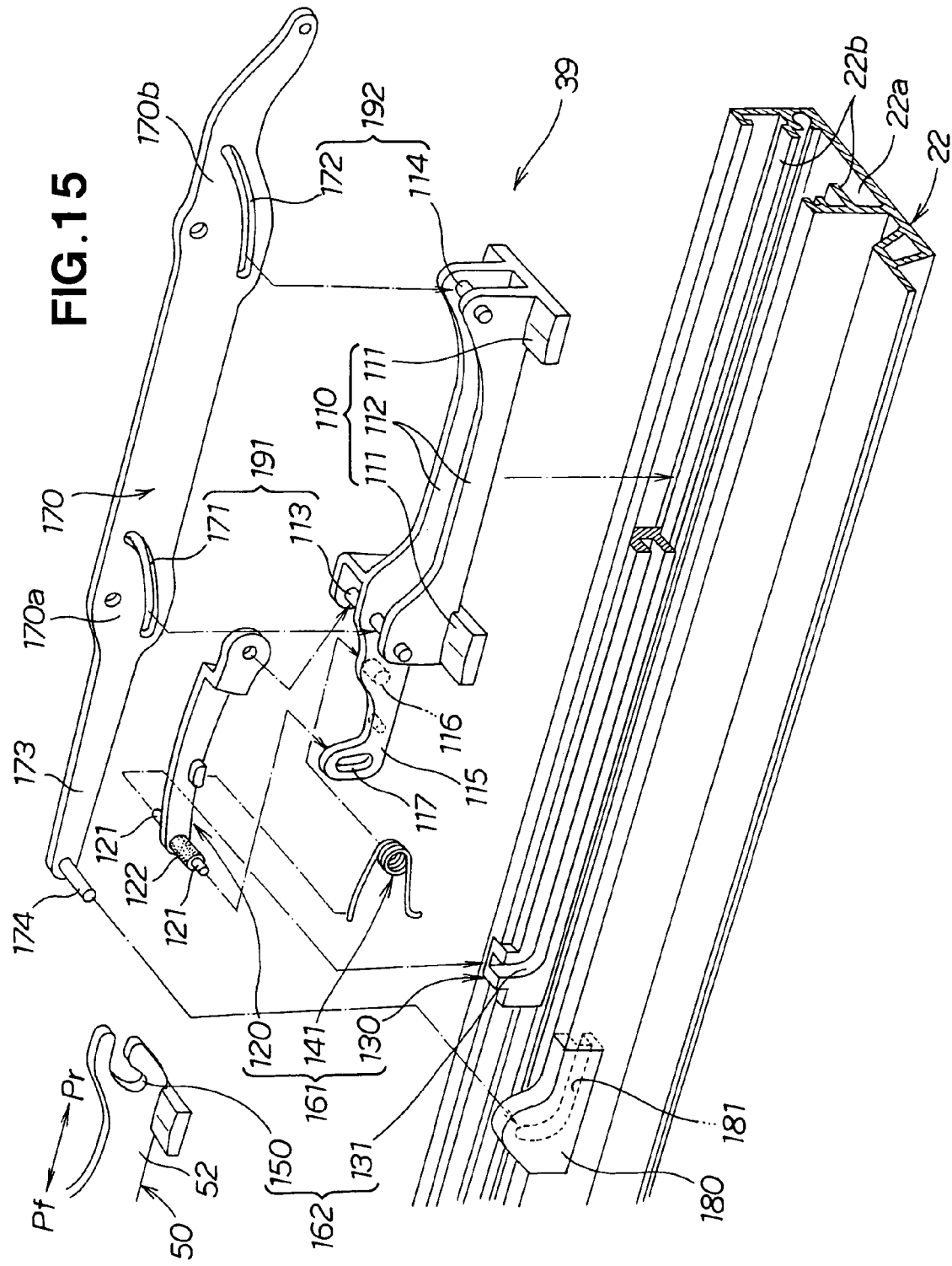
FIG. 15 is an exploded view showing a modification of the fixed member in the left rear panel drive mechanism of FIG. 9.

FIG. 15 shows a left rear panel drive mechanism having a modified fixed member 130. The fixed member 130 of the modification has substantially the same configuration as the fixed member 130 shown in FIGS. 9 and 10B, and identical components are denoted by the same numerical symbols and are not described.

The modified fixed member 130 is characterized in that the substantially level horizontal groove part 134 as part of the locking cam groove 131 is set to be greater in length as shown in FIG. 15. Therefore, regardless of the position of the rear slider 110, the swinging distal end part 121 of the swinging member 120 (linking rod 120) is always fitted into the locking cam groove 131. In other words, the swinging distal end part 121 remains fitted into the horizontal groove part 134 even in cases in which the rear slider 110 has slid to the fully open position RSo (see FIG. 4). With such a configuration, the swinging distal end part 121, the locking cam groove 131, and the slider-side cam groove 150 can be fitted together even more smoothly.

In the present invention, the locking cam groove 131 shown in FIG. 10 can have a configuration in which the distal end part 121 of the linking rod 120 can be displaced between the locked state and the released state. The slider-side cam groove 150 can be configured so that when the front slider 50 moves in the opening direction Pr from the fully closed position FSc and reaches the specific half-open position FSh, the front slider 50 links with the distal end part 121, and the distal end part 121 is guided from the locked state to the released state in the locking cam groove 131. Specifically, another possibility is a configuration in which all the elements are vertically inverted, including, e.g., the direction in which the long hole 117 shown in FIG. 10 extends vertically, the urging direction of the urging member 141, the vertical orientation of the locking cam groove 131, and the vertical orientation of the slider-side cam groove 150.

The sunroof apparatus 30 of the present invention cam be used in various passenger vehicles, including compact automobiles.

Obviously, various minor changes and modifications of the present invention are possible in light of the above teaching. It is therefore to be understood that within the scope of the appended claims the invention may be practiced otherwise than as specifically described.

What is claimed is:

1. A vehicular sunroof apparatus comprising:
a sunroof panel having a front panel and a rear panel that open and close an opening formed in a vehicle roof, the front panel and the rear panel being configured to be opened by causing the front panel to retract from a fully closed state, with a rear end thereof inclined upwardly, along an outside surface of the vehicle roof and by causing the rear panel to retract, during retracting movement of the front panel, from a fully closed state along an inside surface of the vehicle roof; and
a rear panel drive mechanism that effects rising/lowering and opening/closing movements of the rear panel relative to the opening of the vehicle roof, the rear panel drive mechanism having a rear panel support stay that supports the rear panel and that is slidable back and forth and swingable vertically relative to the vehicle roof, and a restricting part that restricts a front end part of the rear panel from rising when a rear end part of the rear panel in the fully closed state thereof is lowered, the restricting part comprising a stay extension extending forward from the rear panel support stay and a stopper member that provides an upper limit of upward swing of the stay extension, the stopper member being provided on the vehicle roof at a position farther forward than the rear panel in the fully closed state thereof.

2. A vehicular sunroof apparatus according to claim 1; wherein the stopper member is configured to restrict the stay extension from swinging upward and from sliding forward and backward when the rear panel is in the fully closed state, and to allow the stay extension to slide forward and backward when the front end part of the rear panel is placed in a lowered position.

3. A vehicular sunroof apparatus according to claim 2; wherein the stopper member has a substantially arcuate guide groove that guides a distal end part of the stay extension, one end of the guide groove being opened so as to allow the distal end part of the stay extension to enter and exit when the front end part of the rear panel is lowered, and an opposite end of the guide groove being positioned higher than the one end of the guide groove and closed so as to restrict the distal end part of the stay extension from rising and from sliding forward and backward when the rear panel is in the fully closed state.

4. A vehicular sunroof apparatus according to claim 1; wherein the rear panel drive mechanism is configured such that when the fully closed rear panel is opened, the rear end part of the rear panel is capable of retracting movement along the inside surface of the roof while being lowered ahead of the front end part of the rear panel.

5. A vehicular sunroof apparatus comprising:
a sunroof panel having a front panel and a rear panel that open and close an opening formed in a vehicle roof, the front panel and the rear panel being configured to be opened by causing the front panel to retract from a fully closed state, with a rear end thereof inclined upwardly, along an outside surface of the vehicle roof and by causing the rear panel to retract, during retracting movement of the front panel, from a fully closed state along an inside surface of the vehicle roof; and
a rear panel drive mechanism that effects rising/lowering and opening/closing movements of the rear panel relative to the opening of the vehicle roof; the rear panel drive mechanism being configured such that when the fully closed rear panel is opened, a rear end part of the rear panel is capable of retracting movement along the inside surface of the roof while being lowered ahead of a front end part of the rear panel, the rear panel drive mechanism comprising:
a rear slider mounted to undergo sliding movement forward and backward relative to the vehicle roof;
a rear panel support stay that supports the rear panel;
a plurality of rear stay engagement parts that engage the rear panel support stay to cause the rear panel support stay to retract while lowering in response to retracting movement of the rear slider; and
a restricting part that restricts the front end part of the rear panel from rising when the rear end part of the rear panel, in the fully closed state thereof is lowered, and that restricts a front end part of the rear panel support stay so that the front end part of the rear panel support stay retracts while lowering after the rear end part of the rear panel support stay when the rear end part of the rear panel support stay retracts while lowering, the restricting part comprising a stay extension extending forwardly from the front end part of the rear panel support stay and a stopper member provided on the vehicle roof at a position farther forward than the rear panel in the fully closed state, the stopper member comprising a guide groove that guides a distal end part of the stay extension.

6. A vehicular sunroof apparatus according to claim 5; the rear stay engagement parts comprise guide pins disposed on the rear slider and cam grooves formed in the rear panel support stay for guided engagement with the respective guide pins.

7. A vehicular sunroof apparatus comprising:
a sunroof panel having a front panel and a rear panel configured to open and close an opening formed in a vehicle roof;
a first drive mechanism that effects rising/lowering and opening/closing movements of the front panel relative to the opening of the vehicle roof; and
a second drive mechanism that effects rising/lowering and opening/closing movements of the rear panel relative to the opening of the vehicle roof, the second drive mechanism comprising a rear panel support stay that supports the rear panel, a stay extension connected to the rear panel support stay and mounted to undergo sliding and vertical swinging movement relative to the vehicle roof, and a stopper member that is mounted on the vehicle roof and that provides an upper limit of vertical swing of the stay extension, and a slider member having a pair of pins and being mounted to undergo sliding movement relative to the vehicle roof the rear panel support stay having a pair of grooves for movable engagement with the respective pins of the slider member.

8. A vehicular sunroof apparatus comprising:

a sunroof panel having front panel and a rear panel configured to open and close an opening formed in, a vehicle roof;

a first drive mechanism that effects rising/lowering and opening/closing movements of the front panel relative to the opening of the vehicle roof; and a second drive mechanism that effects rising/lowering and opening/closing movements of the rear panel relative to the opening of the vehicle roof, the second drive mechanism comprising a rear panel support stay that supports the rear panel, a stay extension connected to the rear panel support stay and mounted to undergo sliding and vertical swinging movement relative to the vehicle roof, and a stopper member that is mounted on the vehicle roof and that provides an upper limit of vertical swing of the stay extension;

wherein the front panel and the rear panel are configured to be opened by causing the front panel to retract from a fully closed state, with a rear end thereof inclined upwardly, along an outside surface of the vehicle roof and by causing the rear panel to retract, during retracting movement of the front panel, from a fully closed state along an inside surface of the vehicle roof; and wherein the stopper member is mounted on the vehicle roof at a position farther forward than the rear panel in the fully closed state thereof.

9. A vehicular sunroof apparatus according to claim 7; wherein the stay extension and the stopper member are connected together so as to restrict a front end part of the rear panel from rising when a rear end part of the rear panel in the fully closed state thereof is lowered.

10. A vehicular sunroof apparatus according to claim 7; wherein the rear panel support stay is slidable back and forth and swingable vertically relative to the vehicle roof; and wherein the stay extension and the stopper member are connected together so as to restrict a front end part of the rear panel support stay so that the front end part of the rear panel support stay retracts while lowering after a rear end part of the rear panel support stay when the rear end part of the rear panel support stay retracts while lowering.

11. A vehicular sunroof apparatus according to claim 7; wherein the rear panel support stay and the stay extension are formed as a unitary structure from a single piece of material.

12. A vehicular sunroof apparatus according to claim 7; wherein the stopper member is configured to restrict the stay extension from swinging upward and from sliding forward and backward when the rear panel is in a fully closed state, and to allow the stay extension to slide forward and backward when a front end part of the rear panel is placed in a lowered position.

13. A vehicular sunroof apparatus according to claim 12; wherein the stopper member has a substantially arcuate guide groove that guides a distal end part of the stay extension, one end of the guide groove being opened so as to allow the distal end part of the stay extension to enter and exit when the front end part of the rear panel is lowered, and an opposite end of the guide groove being positioned higher than the one end of the guide groove and closed so as to restrict the distal end part of the stay extension from rising and from sliding forward and backward when the rear panel is in the fully closed state.

14. A vehicular sunroof apparatus according to claim 7; wherein the second drive mechanism is configured such that when the rear panel is opened from a fully closed state, a rear end part of the rear panel is capable of retracting movement along the inside surface of the roof while being lowered ahead of a front end part of the rear panel.

15. A vehicular sunroof apparatus according to claim 7; wherein the second drive mechanism further comprises a rear slider mounted to undergo sliding movement forward and backward relative to the vehicle roof, and a plurality of rear stay engagement parts that engage the rear panel support stay to cause the rear panel support stay to retract while lowering in response to retracting movement of the rear slider; and wherein the stay extension and the stopper member restrict a front end part of the rear panel from rising when a rear end part of the rear panel in the fully closed state thereof is lowered, and that restricts a front end part of the rear panel support stay so that the front end part of the rear panel support stay retracts while lowering after the rear end part of the rear panel support stay when the rear end part of the rear panel support stay retracts while lowering.

* * * * *